United States Patent
Ishibashi

(10) Patent No.: US 9,145,917 B2
(45) Date of Patent: Sep. 29, 2015

(54) CAGE FOR RADIAL ROLLER BEARING

(71) Applicant: NSK Ltd., Tokyo (JP)

(72) Inventor: Yutaka Ishibashi, Gunma (JP)

(73) Assignee: NSK Ltd., Tokyo (JP)

( * ) Notice: Subject to any disclaimer, the term of this patent is extended or adjusted under 35 U.S.C. 154(b) by 281 days.

(21) Appl. No.: 13/824,355

(22) PCT Filed: Oct. 16, 2012

(86) PCT No.: PCT/JP2012/076737
§ 371 (c)(1),
(2) Date: Mar. 16, 2013

(87) PCT Pub. No.: WO2014/024327
PCT Pub. Date: Feb. 13, 2014

(65) Prior Publication Data
US 2015/0176646 A1 Jun. 25, 2015

(30) Foreign Application Priority Data

Aug. 10, 2012 (JP) ................................. 2012-178317
Sep. 13, 2012 (JP) ................................. 2012-201216

(51) Int. Cl.
*F16C 33/46* (2006.01)
*F16C 19/26* (2006.01)

(52) U.S. Cl.
CPC ............. *F16C 33/4694* (2013.01); *F16C 19/26* (2013.01); *F16C 33/46* (2013.01); *F16C 33/4617* (2013.01); *F16C 33/4635* (2013.01); *F16C 33/4676* (2013.01); *F16C 2226/70* (2013.01); *F16C 2226/76* (2013.01)

(58) Field of Classification Search
CPC .......................... F16C 33/4635; F16C 33/4694
See application file for complete search history.

(56) References Cited

U.S. PATENT DOCUMENTS 4,472,007 A * 9/1984 De Vito .......................... 384/572
5,178,474 A * 1/1993 Muntnich et al. .............. 384/577

FOREIGN PATENT DOCUMENTS

| GB | 1352909 | 5/1974 |
|----|---------|--------|
| JP | 48-59926 U | 7/1973 |
| JP | 54-111242 U | 8/1979 |
| JP | 55-115435 U | 8/1980 |
| JP | 60-71728 U | 5/1985 |
| JP | 2-89814 A | 3/1990 |
| JP | 2011-89612 A | 5/2011 |

* cited by examiner

*Primary Examiner* — Thomas R. Hannon
(74) *Attorney, Agent, or Firm* — Miles & Stockbridge P.C.

(57) ABSTRACT

A cage 7b for a radial roller bearing is achieved that can be manufactured by axial draw molding, and in which end sections 12c that are provided on both sides of a non-continuous section 11a fit together so that relative displacement in the radial direction is possible, and so that relative displacement in the axial direction is not possible. A fitting section 13a where the end sections 12c, 12d fit together comprises an inside fitting piece 17 that is provided in the middle section in the axial direction of one end section 12c, and a pair of outside fitting pieces 18a, 18b that are provided in separated portions on both sides in the axial direction of the other end section 12d so as to not overlap each other with regard to the axial direction. When assembled in a radial roller bearing, by placing the inside fitting piece 17 in the portion between the outside fitting pieces 18a, 18b, the inside fitting piece 17 fits with the outside fitting pieces 18a, 18b in the axial direction without the fitting piece and the outside fitting pieces 18a, 18b overlapping in the radial direction.

6 Claims, 17 Drawing Sheets

CAGE FOR RADIAL ROLLER BEARING

TECHNICAL FIELD

The present invention relates to a cage for a radial roller bearing that is made of synthetic resin and that has a non-continuous section in one location in the circumferential direction.

BACKGROUND ART

Of the rotational support sections of various kinds of machinery, radial roller bearings such as the radial roller bearing 1 illustrated in FIG. 23 are assembled in portions where large radial loads are applied. This radial roller bearing 1 is constructed such that a plurality of rollers 6 that are provided between a cylindrical shaped outer-ring raceway 3, which is formed around the inner circumferential surface of an outer-diameter side member 2, and a cylindrical shaped inner-ring raceway 5, which is formed around the outer circumferential surface of a shaft 4 that is located on the inner-diameter side, are supported by a cage 7 so as to be able to roll freely. As combinations of an outer-diameter side member 2 and shaft 4, there is a combination of a housing, which does not rotate even during operation, and a rotating shaft, and a combination of a gear or roller, which rotates during operation, and a support shaft thereof. In this specification, radial needle bearings that use needles are also included as a radial roller bearing.

As illustrated in FIG. 24, the cage 7 is completely constructed into a cylindrical shape using a synthetic resin material. The cage 7 has a pair of circular ring shaped rim sections 8 that are arranged concentric with each other and separated from each other in the axial direction, and has a plurality of column sections 9 that are arranged intermittently in the circumferential direction and span between the rim sections 8. The portions that are surrounded on four sides by adjacent column sections 9 in the circumferential direction and the rim sections 8 form pockets 10 for supporting the rollers 6 so as to be able to roll freely. With the rollers 6 held inside the pockets 10 so as to be able to roll freely, this kind of cage 7 is provided between the inner circumferential surface of the outer-diameter side member 2 and the outer circumferential surface of the shaft 4 so as to be able to rotate relative to the outer-diameter side member 2 and shaft 4. This cage 7 rotates with respect to the outer-diameter side member 2 and shaft 4 together with the revolving motion of the rollers 6.

When assembling the radial roller bearing 1, in order to arrange the cage 7 around the inner-ring raceway 5, the cage 7 is inserted from the end section of the shaft 4, and moved in the axial direction until it surrounds the inner-ring raceway 5. Incidentally, in this case, of the outer circumferential surface of the shaft 4, when there is an obstacle such as an outward-facing flange section or the like that has an outer diameter dimension that is greater than the inner diameter dimension of the cage 7 in the middle portion in the axial direction between the end section of the shaft 4 and the inner-ring raceway 5, this obstacle is in the way, and it may not be possible to move the cage 7 to a position surrounding the inner-ring raceway 5.

Therefore, as a cage that is capable of eliminating this kind of trouble, there is a cage (split cage) having a non-continuous section in one location in the circumferential direction 1 such as disclosed in GB 1,352,909 (A), JP 2-089814 (A), and JP 54-111242 (U). FIG. 25 illustrates the cage 7a that is disclosed in GB 1,352,909 (A). This cage 7a is made of a synthetic resin and has a non-continuous section 11 at one location in the circumferential direction. Moreover, the end sections 12a, 12b that are separated by this non-continuous section 11 fit together with an uneven fit by way of fitting sections 13.

One set each, of an outer-diameter side fitting pieces 14a, 14b and inner-diameter side fitting pieces 15a, 15b that form fitting sections 13 is formed on each of the end sections 12a, 12b. More specifically, of one end section 12a, an outer-diameter side fitting piece 14a is formed on one half section in the axial direction of the outer-diameter side half section, and an inner-diameter side fitting piece 15a is formed on the other half section in the axial direction of the inner-diameter side half section. Moreover, of the other end section 12b, an outer-diameter side fitting piece 14b is formed on the other half section in the axial direction of the outer-diameter side half section, and an inner-diameter side fitting piece 15b is formed on the one half section in the axial direction of the inner-diameter side half section. Together with fitting the pair of outer-diameter side fitting pieces 14a, 14b and pair of inner-diameter side fitting pieces 15a, 15b together in the axial direction on the outer-diameter side half section and inner-diameter side half section of the fitting section 13, the outer-diameter side fitting pieces 14a, 14b and inner-diameter side fitting pieces 15a, 15b are fitted together in the radial direction on the one half section in the axial direction and the other half section in the axial direction of the fitting section 13. In the example in FIG. 25, the state in which the end sections 12a, 12b are not fitted together is illustrated, however, when the cage 7a is assembled in the radial roller bearing, the width of the non-continuous section 11 becomes narrow, and end sections 12a, 12b fit together.

Concave sections 16a, 16b are formed in the circumferential surface of the pair of rim sections 8a, 8b. More specifically, on the outer circumferential surface of one rim section 8a, concave sections 16a that are recessed inward in the radial direction are formed at portions that are aligned in the axial direction with the pockets 10, and on the inner circumferential surface of the other rim section 8b, concave sections 16b that are recessed outward in the radial direction are formed at portions that are aligned in the axial direction with the pockets 10.

This kind of cage 7a is formed by so-called axial draw molding in which synthetic resin is injected inside the cavity of an axial draw mold (mold tool) that is formed by a pair of split molds (mold tool elements), after which these split molds are separated in the axial direction. Therefore, when compared with the case of using radial draw molding, in which the mold is a complex mold which comprises a pair of mold elements that move in the axial direction and a plurality of mold elements that move in the radial direction, the manufacturing cost of the cage 7a is kept low in the axial draw molding. This axial draw molding is performed by moving a pair of split molds in the axial direction, so when removing the split molds, it is possible to prevent damage such as plastic deformation or bleaching from occurring in the stopper sections that are provided on the edge sections of the openings of the pockets for preventing the rollers from dropping out. Therefore, axial draw molding is preferably used in cases where the volume of the stopper sections is so large that so-called unreasonable removal work in which the mold elements are removed to the outer-diameter side by pressing and elastically expanding the stopper sections is difficult, or in cases where column sections are arranged in portion further on the outside in the radial direction than the pitch circle diameter of the rollers such that it is difficult to remove the mold elements to the outside in the radial direction.

In either case, in the case of the cage 7a, it is possible to expand the width of the non-continuous section 11 in the circumferential direction due to the elastic deformation of the cage 7a. Therefore, by expanding the width of this non-continuous section 11 wider than the outer-diameter dimension of the shaft 4 around which the cage 7a is assembled, it becomes possible to assemble the cage 7a around the shaft 4 by passing the shaft 4 through the non-continuous section 11 (between the end sections 12a, 12b). Moreover, even in the case where there is an obstacle in the middle portion in the axial direction between the end section of the shaft 4 and the inner-ring raceway 5, the cage 7a can be assembled by elastically expanding cage 7a enough to ride over the obstacle, and moving the cage 7a in the axial direction to where it surrounds the shaft 4.

Incidentally, in the case of the cage 7a having conventional construction, the end sections 12a, 12b that are both sides of the non-continuous section 11 fit together by way of the fitting sections 13 not only so that there is not relative displacement in the axial direction, but also so that there is no relative displacement in the radial direction. Therefore, during operation of the radial roller bearing, expansion of the diameter of the cage due to centrifugal force is prevented. Moreover, in this case, the outer-diameter side fitting pieces 14a, 14b and the inner-diameter side fitting pieces 15b, 15a are pressed in the radial direction, so it becomes easy for wear of these outer-diameter side fitting pieces 14a, 14b and inner-diameter side fitting pieces 15b, 15a to advance, and in the worst case, there is a possibility the pieces might break.

Moreover, during operation, the outer-diameter side fitting pieces 14a, 14b and inner-diameter side fitting pieces 15b, 15a are pressed in the radial direction, so the force required to cause relative displacement in the circumferential direction of the end sections 12a, 12b becomes large. Therefore, in the case when assembled in a radial roller bearing that is assembled in manual transmission or the like, there is the possibility of a problem in that the width of the non-continuous section 11 cannot be expanded or contracted smoothly, and thus it becomes impossible to sufficiently prevent fretting wear.

Construction in which the end section that are provided on both sides of the non-continuous section can displace relative to each other in the radial direction can be achieved comparatively easily by radial draw molding that is performed by using mold elements that move in the radial direction. However, as described above, in radial draw molding, the number of parts of the mold that is used in injection molding increases, so there is a problem in that the manufacturing cost increases.

Improvement examples of the construction of a fitting section are disclosed in JP 2-089814 (A) and JP 54-111242 (U), however, even in the construction in these cases, there is the possibility that the same problems as those in the construction disclosed in GB 1,352,909 (A) will occur. The related literature above is incorporated in this specification by reference.

RELATED LITERATURE

Patent Literature

[Patent Literature 1] GB 1,352,909 (A)
[Patent Literature 2] JP 2-089814 (A)
[Patent Literature 3] JP 54-111242 (U)

SUMMARY OF THE INVENTION

Problem to be Solved by the Invention

Taking the problems above into consideration, the object of the present invention is to achieve construction of a cage for a radial roller bearing that can be manufactured by axial draw molding, and so that the end sections on both sides of the non-continuous section can fit together such that relative displacement in the radial direction is possible, and that relative displacement in the axial direction is not possible.

Means for Solving the Problems

The cage for a radial roller bearing of the present invention, that is made into a single piece by injection molding using an axial draw mold having a pair of split molds, and has: a pair of rim sections, a plurality of column sections, a plurality of pockets and a fitting section, and is provided with a non-continuous section at one location in the circumferential direction.

Of these, the pair of rim sections are incomplete ring shaped, and are provided concentric to each other with a space between them in the axial direction. Of the circumferential surface of these rim sections, concave sections that are recessed in the radial direction are formed at positions that are aligned in the axial direction with the pockets. The formation locations of these concave sections are opposite in the radial direction on both sides in the axial direction of the pockets. The fitting section is such that the end sections that are provided on both sides of the non-continuous section fit together.

In the case of the cage for a radial roller bearing of the present invention, the fitting section has an inside fitting piece that is provided on one of the end sections, and a pair of outside fitting pieces that are provided on the other end section. Of these, the inside fitting piece is provided in the middle section in the axial direction of the one end, section, and extends in the circumferential direction toward the other end section. On the other hand, the pair of outside fitting pieces are provided in separated portions on both sides in the axial direction of the other end section, extend in the circumferential direction toward the one end section, and do not overlap each other with respect to the axial direction (when seen from the axial direction). In other words, these outside fitting pieces are such that the formation positions in the radial direction are offset from each other.

In the present invention, the inside fitting piece is placed in the portion between the outside fitting pieces (with respect to the axial direction). As a result, the inside fitting piece and the outside fitting pieces fit together in the axial direction without the inside fitting piece and the outside fitting pieces overlapping each other in the radial direction.

When embodying the present invention, it is possible to form cut away sections in both the inner-diameter side portion of one side in the axial direction of the inside fitting piece and the outer-diameter side portion of the other side in the axial direction. In this case, the boundary surfaces in the axial direction of the inside fitting peace with the cut away sections can be tapered surfaces.

Moreover, when forming the cut away sections on the inside fitting piece, by making the pair of cut away section continuous in the radial direction, the inside fitting piece can comprise a pair of inside fitting elements that are separated in the axial direction.

When embodying the present invention, it is possible to offset the end sections in the axial direction of the pair of outside fitting pieces of the fitting section further toward the center side in the axial direction than the side surfaces (outside surfaces) in the axial direction of the rim sections. In this case, insertion spaces are formed in the portions on both sides of the fitting section.

Furthermore, when embodying the present invention, the outside fitting pieces can comprise a plurality of (two or more) outside fitting thin plates that are separated in the radial direction.

In this way, the cage for a radial roller bearing of the present invention has a pair of rim sections, a plurality of column sections, a plurality of pockets, a non-continuous section that is provided at one location in the circumferential direction, and a fitting section where end sections on both sides of the non-continuous section fit together; and this fitting section comprises at least a pair of outside fitting pieces that are provided at two separated locations in the axial direction of one of the end sections, and extend in the circumferential direction toward the other end section, the widths in the radial direction being less than the width in the radial direction of the end section, and that do not overlap with each other with respect to the axial direction, and at least one inside fitting sections that is located on the other end section in the portion in the axial direction between the outside fitting sections, and fits with the outside fitting sections without overlapping the outside fitting sections in the radial direction.

Effect of the Invention

With the present invention, construction of a cage for a radial roller bearing is achieved wherein together with it being possible to manufacture the cage by axial draw molding, end sections that are provided on both sides of a non-continuous section fit together so that relative displacement in the radial direction is possible, and so that relative displacement in the axial direction is not possible.

In other words, in the cage for a radial roller bearing of the present invention, a fitting section where the end sections on both sides of a non-continuous section fit together comprises an inside fitting piece that is provided on one end section, and a pair of outside fitting pieces that are provided on the other end section, in which the inside fitting piece is located in the portion between the outside fitting pieces, and this inside fitting piece and the outside fitting pieces fit together only in the axial direction without overlapping each other in the radial direction. Therefore, the fitting section is such that the end sections fit together so that relative displacement is possible in the radial direction, and so that relative displacement is not possible in the axial direction.

Therefore, by the present invention, during operation the inside fitting piece and the outside fitting pieces of the fitting section are not pressed in the radial direction, and thus together with no damage, such as wear, occurring to the inside fitting piece and outside fitting pieces, it is possible for the diameter of the cage for a radial roller bearing to expand due to the action of centrifugal force. Moreover, the force required for causing relative displacement in the circumferential direction of the end sections is small, so it is possible for the non-continuous section to smoothly expand or contract. As a result, when assembled in a radial roller bearing that is assembled in a manual transmission or the like, it is possible to effectively prevent fretting wear from occurring.

Furthermore, in the cage for a radial roller bearing of the present invention, the structure in which the pair of outside fitting pieces do not overlap each other with regard to the axial direction gives the possibility to pull out in the axial direction portions of the split molds that were provided for forming a space for the inside fitting piece during the production process thereof, and the concave sections are formed in the rim sections so as to pull out in the axial direction portions of the split molds that were provided for forming pockets. In this way, the pair of split molds are regulated to shapes so as to be able to be removed in the axial direction after injection molding without damaging the cage, so the cage for a radial roller bearing of the present invention can be manufactured using axial draw molding.

In construction where a pair of cut away sections are formed on the inside fitting piece, it is possible to reduce the volume of the inside fitting piece. Therefore, after injection molding, it is possible to prevent the occurrence of deformation such as shrinkage depressions or bending to the inside fitting piece, and it is possible to improve the dimension precision (shape precision). Moreover, together with reducing the weight of the cage for a radial roller bearing, it is possible to also reduce the material cost.

By making the boundary surfaces in the axial direction with the cut away sections of the inside fitting piece tapered surfaces, it is possible to reduce the volume of the inside fitting piece while at the same time maintaining the strength and rigidity of the inside fitting piece.

Moreover, by making the inside fitting piece so as to comprise a pair of inside fitting elements that are separated in the axial direction, it is possible to greatly reduce the volume of the inside fitting piece. Therefore, it is possible to reduce the weight and material cost of the cage for a radial roller bearing to an even higher degree.

In construction where the formation locations of the outside fitting pieces are offset toward the inside in the axial direction, with positioning pins inserted in insertion spaces that occur as a result, it is possible to perform automatic assembly of the radial roller bearing (work of inserting the rollers inside the pockets). Therefore, it is possible to easily position the cage for a radial roller bearing in the circumferential direction, and it is possible to improve the efficiency of the assembly work. Moreover, together with being able reduce the weight by the amount of the formed insertion spaces, there is also an advantage from the aspect of preventing shrinkage depressions during injection molding.

Furthermore, in the case where the outside fitting pieces comprise a plurality of outside fitting thin plates that are separated in the radial direction, it is possible to keep the dimension in the radial direction from the outside surface in the radial direction of the entire outside fitting pieces to the inside surface in the radial direction large. Therefore, it becomes difficult for the inside fitting piece to ride up on the outside fitting pieces. As a result, it is possible to effectively prevent relative displacement in the axial direction of the end sections that are provided on both sides of the non-continuous section.

MODES FOR CARRYING OUT THE INVENTION

First Example

Figure 23:
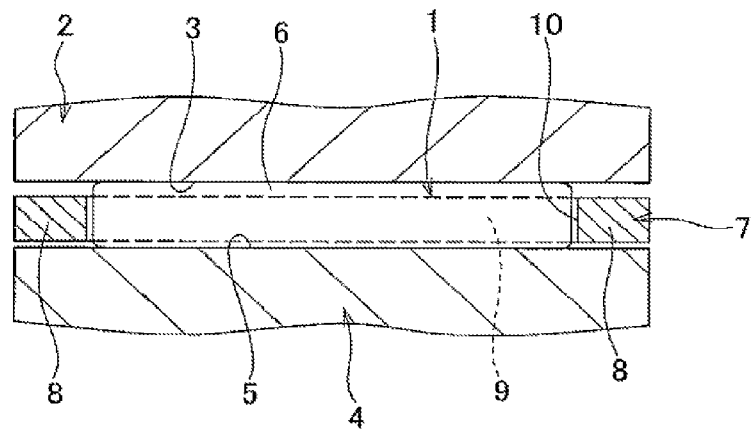
FIG. 23 is a cross-sectional drawing of a rotational support section in which a radial roller bearing with cage is assembled.
Figure 24:
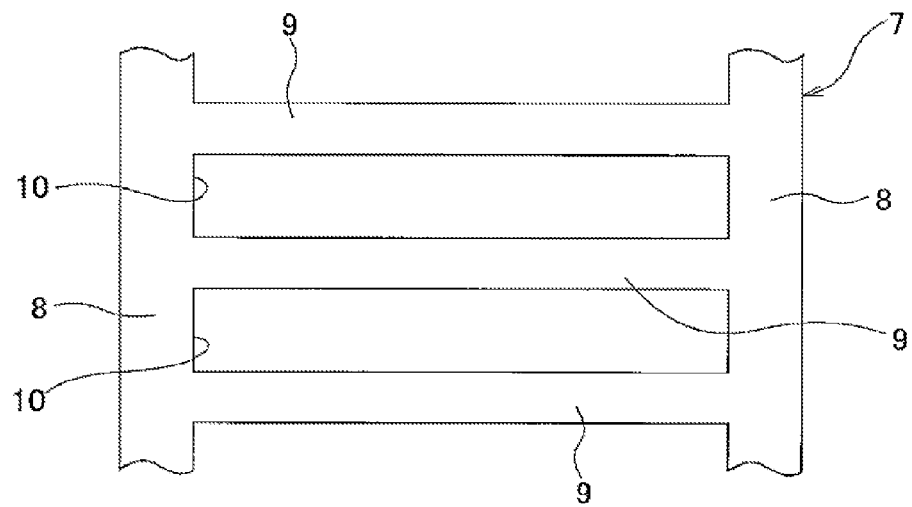
FIG. 24 is a view of part in the circumferential direction of a cage as seen in the radial direction.
Figure 25:
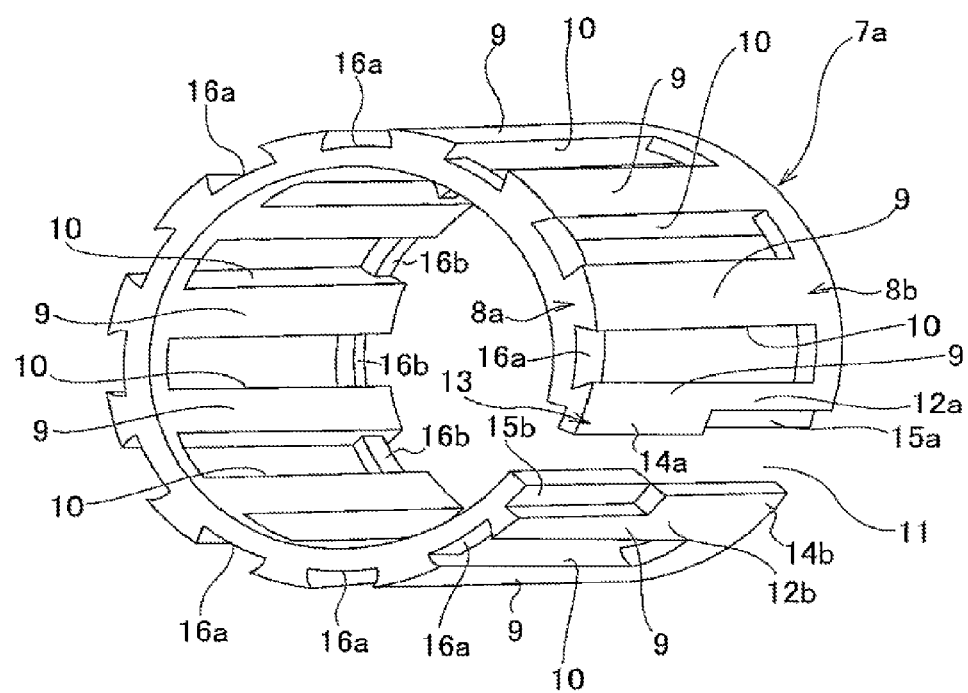
FIG. 25 is a perspective drawing of a conventional cage for a radial roller bearing.

FIG. 1 to FIG. 4 illustrate a first example of an embodiment of the present invention. The cage 7b for a radial roller (needle) bearing of this example comprises a pair of rim sections 8c, 8d, which have an incomplete ring shape and that are arranged concentric with each other having a space in the axial direction between them, and a plurality of column sections 9 that are provided intermittently in the circumferential direction and span between the rim sections 8c, 8d. The portions that are surrounded on four sides by column sections 9 that are adjacent in the circumferential direction, and the rim sections 8c, 8d function as pockets 10 that hold rollers 6 (refer to FIG. 23) so as to be able to roll freely.

In portions of the circumferential surface of the rim sections 8c, 8d that are aligned in the axial direction with the pockets 10, concave sections 16c that are recessed inward in the radial direction and concave sections 16d that are recessed outward in the radial direction are provided so as to alternate in the circumferential direction and so as to differ with each other between the rim sections 8c, 8d. In other words, concave sections 16c and concave sections 16d, which are formed in opposite directions in the radial direction, are arranged one by one in the portions on both sides in the axial direction of the pockets 10. Moreover, the width dimension in the circumferential direction of these concave sections 16c, 16d is the same as the width direction in the circumferential direction of the pockets 10, and the depth dimension in the radial direction is ½ the thickness dimension in the radial direction of the rim sections 8c, 8d. During manufacturing, when moving a pair of split molds of an axial draw mold in the axial direction, these kinds of concave sections 16c, 16d pass portions that are provided for forming the pockets 10 in the axial direction.

A non-continuous section 11a is provided at one location in the circumferential direction of the cage 7b. The end sections 12c, 12d (column sections 9) that are on both sides of this non-continuous section 11a fit with each other by way of a fitting section 13a. Particularly, in this example, an inside fitting piece 17 is formed in the middle section (center section) in the axial direction of one end section 12c of these end sections 12c, 12d, so as to extend in the circumferential direction toward the other end section 12d. On the other hand, a pair of outside fitting pieces 18a, 18b are formed in separated portions on both sides in the axial direction of the other end section 12d so as to extend in the circumferential direction toward the one end section 12c.

Figure 4:
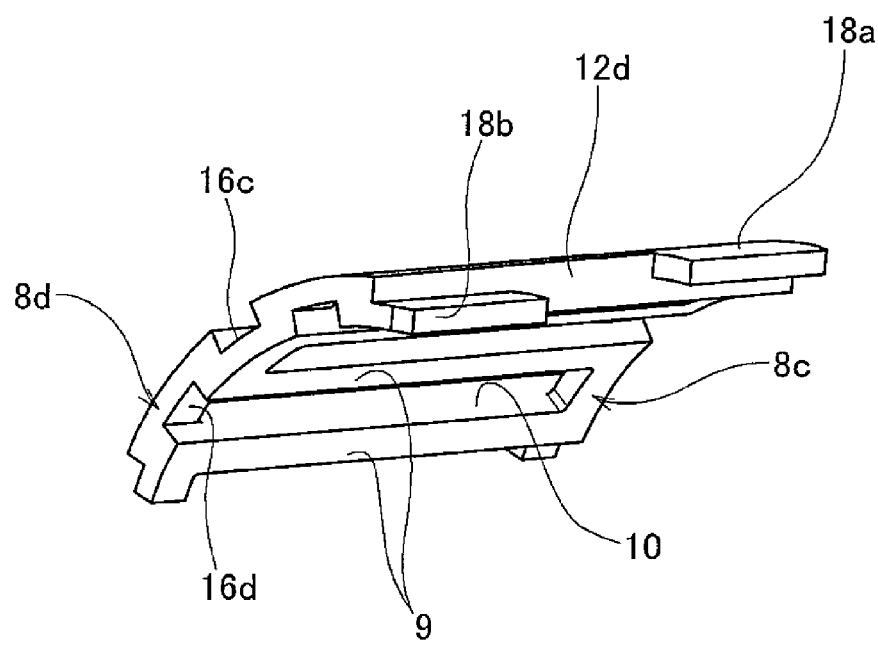
FIG. 4 is a perspective drawing illustrating the other end section and its adjacent area of the cage of the first example.

In this example, the inside fitting piece 17 and outside fitting pieces 18a, 18b are all rectangular plate shaped (partial cylindrical shaped). Moreover, the dimension in the axial direction of the inside fitting piece 17 is the same as dimension in the axial direction of the outside fitting pieces 18a, 18b. In other words, the dimension in the axial direction of the inside fitting piece 17 and outside fitting pieces 18a, 18b is ⅓ the dimension in the axial direction of the end sections 12a, 12b (over all width). Moreover, the dimension in the radial direction of the inside fitting piece 17 is the same as the dimension in the radial direction of the one end section 12c, and the dimension in the radial direction of the outside fitting pieces 18a, 18b is about ½ (at least no more than ½) the dimension in the radial direction of the other end section 12d. As illustrated in FIG. 4, one of the outside fitting pieces 18a is provided on one end section in the axial direction of the outer-diameter side half section of the other end section 12d, and the other outside fitting piece 18b is provided on the other end section in the axial direction of the inner-diameter side half section of the other end section 12d. In this way, the outside fitting pieces 18a, 18b do not overlap each other with regard to the axial direction.

In the construction in the figures, construction is such that the surfaces on both side in the radial direction of the outside fitting pieces 18a, 18b are parallel with each other, however, a tapered surfaces are possible where the inside surface in the radial direction of the outside fitting piece 18a that is provided on the outer-diameter side half section of the end section 12d and the outside surface in the radial direction of the outside fitting piece 18b that is provided on the inner-diameter side half section of the end section 12d can be inclined in a direction such that the dimension in the radial direction of the outside fitting pieces 18a, 18b becomes smaller going from the center side in the axial direction of the cage 7b toward the end sides in the axial direction (rim sections 8a, 8b). By employing this kind of construction, it is possible to easily pull out the pair of split molds during manufacturing.

Figure 1:
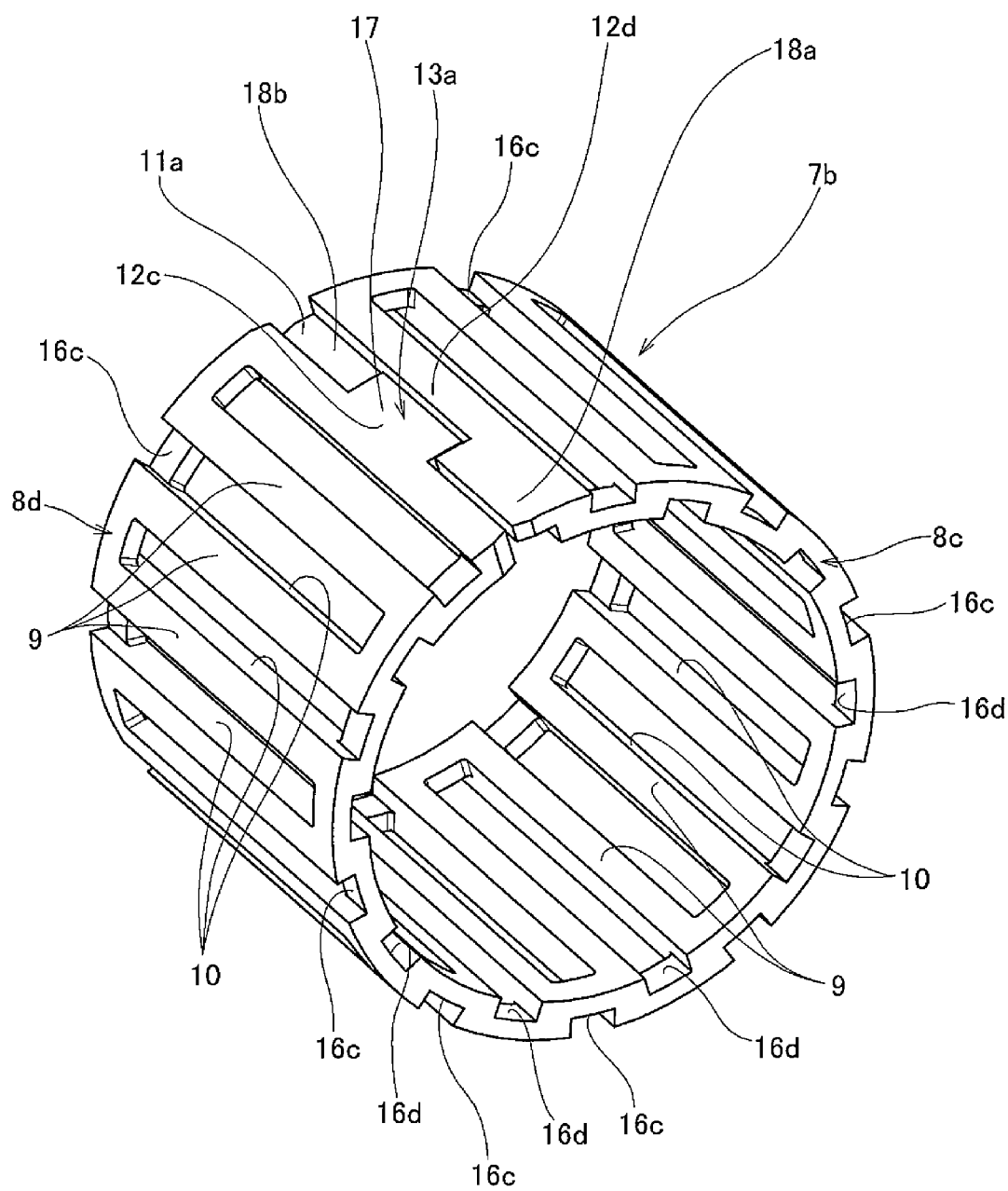
FIG. 1 is a perspective drawing illustrating a cage of a first example of an embodiment of the present invention.
Figure 2:
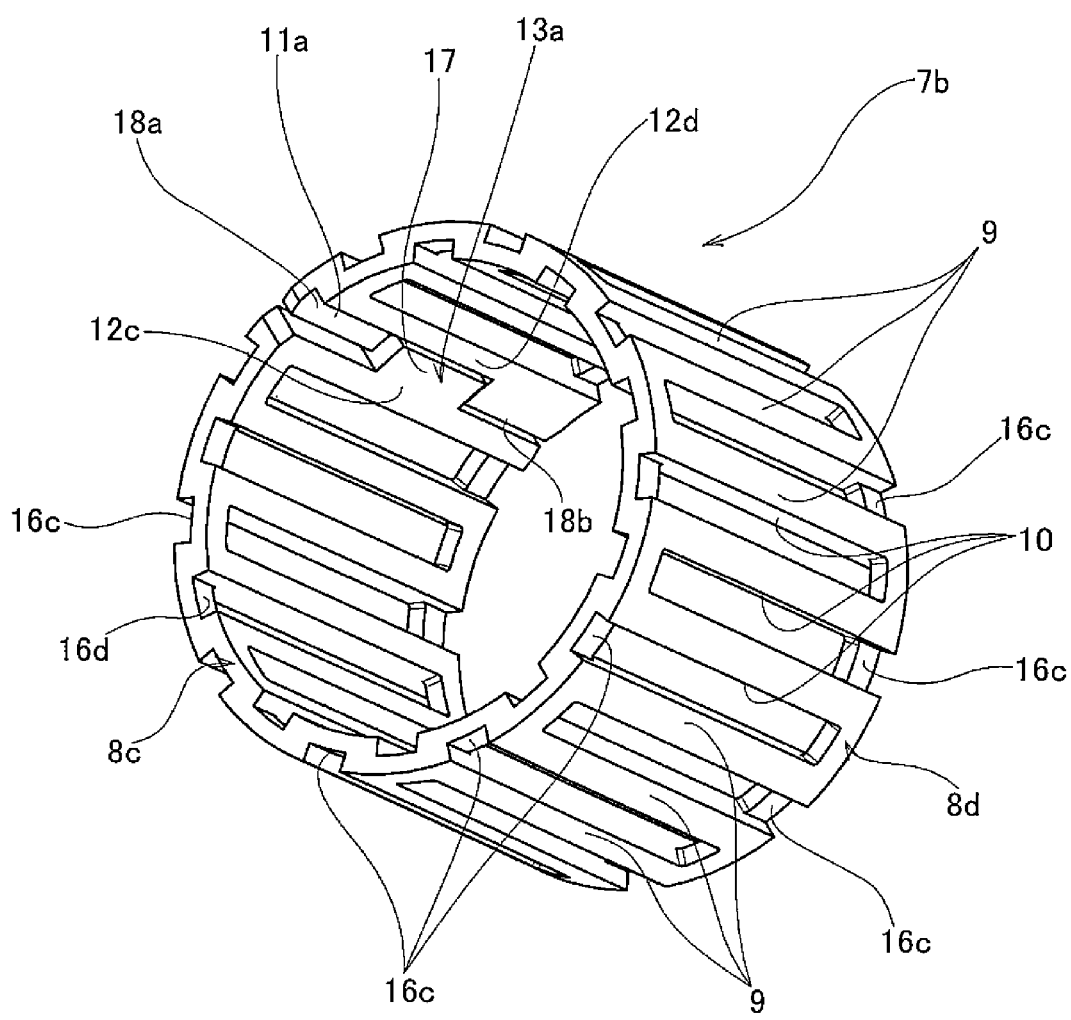
FIG. 2 is a perspective drawing of the cage of the first example as seen from a different angle from below in FIG. 1).
Figure 3:
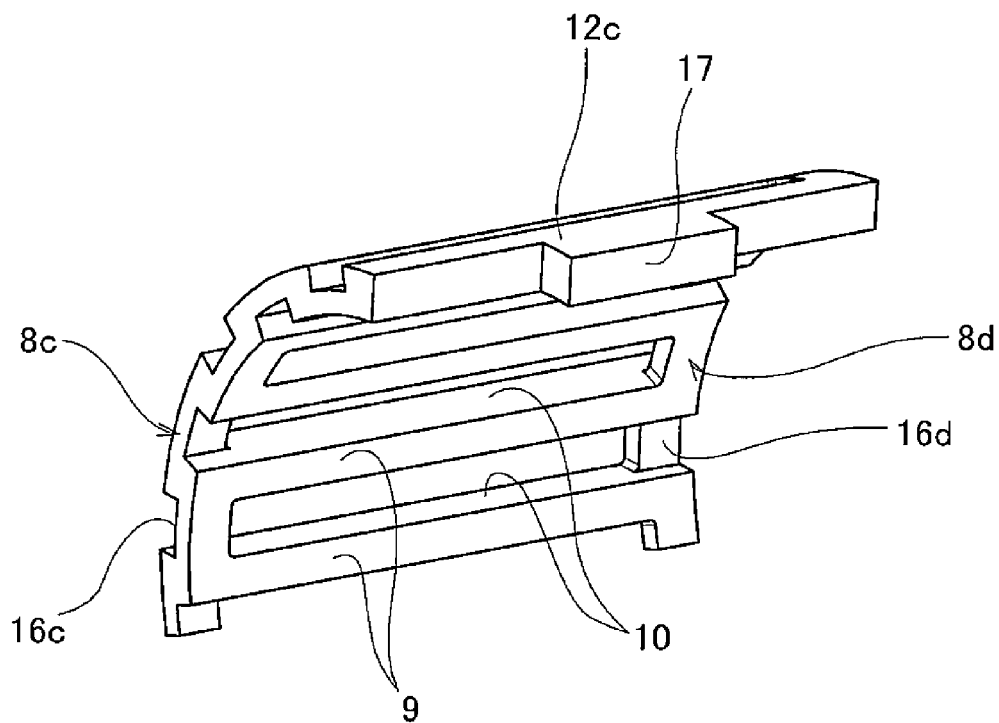
FIG. 3 is a perspective drawing illustrating one end section and its adjacent area of the cage of the first example.

In either case, when the cage 7b having this kind of construction is assembled in a radial roller bearing, the inside fitting piece 17 is located in the portion between the outside fitting pieces 18a, 18b as illustrated in FIG. 1 and FIG. 2. As a result, it is possible to fit the inside fitting piece 17 and the outside fitting pieces 18a, 18b together in the axial direction without the inside fitting piece 17 and the outside fitting pieces 18a, 18b overlapping each other in the radial direction. More specifically, both side surfaces in the axial direction of the inside fitting piece 17 closely face the other side surface (side surface on the left side in FIG. 4) in the axial direction of the outside fitting piece 18a and the one side surface (side surface on the right side in FIG. 4) of the outside fitting piece 18b.

The cage 7b of this example, having this kind of construction, can be manufacturing using axial draw molding, and during use, the end sections 12c, 12d that are located on both side of the non-continuous section 11a can be fitted together so that relative displacement in the radial direction is possible, and so that relative displacement in the axial direction is not possible.

In other words, in this example, fitting section 13a comprises an inside fitting piece 17 that is provided on one end section 12c, and a pair of outside fitting pieces 18a, 18b that are provided on the other end section 12d, and by placing the inside fitting piece 17 in the portion between the outside fitting pieces 18a, 18b, the inside fitting piece 17 and the outside fitting pieces 18a, 18b fit together only in the axial direction without overlapping in the radial direction. Therefore, the fitting section 13a is such that the end sections 12c, 12d fit together so that relative displacement in the radial direction is possible, and so that relative displacement in the axial direction is not possible. Therefore, in the cage 7b of this example, during operation, the inside fitting piece 17 and outside fitting pieces 18a, 18b of the fitting section 13a are not pressed in the radial direction, so damage such as wear of these pieces does not occur, and the diameter of the cage 7b can expand due to the action of centrifugal force. Moreover, the force required to cause the end sections 12c, 12d to displace relative to each other in the circumferential direction is reduced, and thus it is possible for the non-continuous section 11a to expand or contract smoothly. As a result, when assembled in a radial roller bearing that is assembled in a manual transmission or the like, it is possible to effectively prevent fretting wear.

Furthermore, the cage 7b of this example is constructed so that the outside fitting pieces 18a, 18b do not overlap with regard to the axial direction, or in other words, the formation locations of these pieces in the radial direction are shifted from each other, so of the split molds of the axial draw mold, the portion that is provided for forming a space (portion between the outside fitting pieces 18a, 18b) for the inside fitting piece 17 can be pulled out in the axial direction without interference with the outside fitting pieces 18a, 18b. Moreover, of the circumferential surface of the rim sections 8c, 8d, concave sections 16c that are recessed inward in the radial direction, and concave sections 16d that are recessed outward in the radial direction are formed so as to alternate in the circumferential direction in the portions that are aligned in the axial direction with the pockets 10, so the portion of the split molds that are provided for forming the pockets 10 can be pulled out in the axial direction without interference with the rim sections 8c, 8d.

In this way, the cage 7b of this example is regulated to a shape such that a pair of split molds can be separated in the axial direction without damaging the cage after injection molding, so the cage 7b can be manufactured using axial draw molding. More specifically, the cage of this example can be manufactured such that injection molding using synthetic resin is performed in the same was as in the case of a typical synthetic resin cage in which polyamide resin, polyphenylene sulfide resin, or these resins mixed with reinforcement fibers is injected into the cavity of an axial draw mold (mold tool) having a pair of split molds (not illustrated in the figure), after which the split molds are pulled out and removed in the axial direction.

Therefore, the cage 7b of this example can be manufactured using axial draw molding that is able to keep manufacturing costs low, and the end sections 12c, 12d on both sides of the non-continuous section 11a can fit together so that relative displacement in the radial direction is possible, and so that relative displacement in the axial direction is not possible.

The cage 7b of this example is manufactured using axial draw molding, so in the state immediately after the pair of split molds are pulled out in the axial direction, the end sections 12c, 12d are still not fitted together and there is a gap between these end sections 12c, 12d. However, in the process of the cage 7b being cooled to room temperature, the diameter of the cage contracts, so as illustrated in the figure, the end sections 12c, 12d fit together. In the actual case, in the cooling process, it is possible that the cage 7b will not contract as desired, however, the cage 7b is manufactured using synthetic resin and has high elasticity, so after assembly it is elastically deformed by opposing members and put into the desired shape.

The other construction, functions and effects of this example, including assembling the cage 7b around the shaft where there is an obstacle such as an outward facing flange shaped section by expanding the width of the non-continuous section 11a, are the same as in the conventional construction.

Second Example

Figure 5:
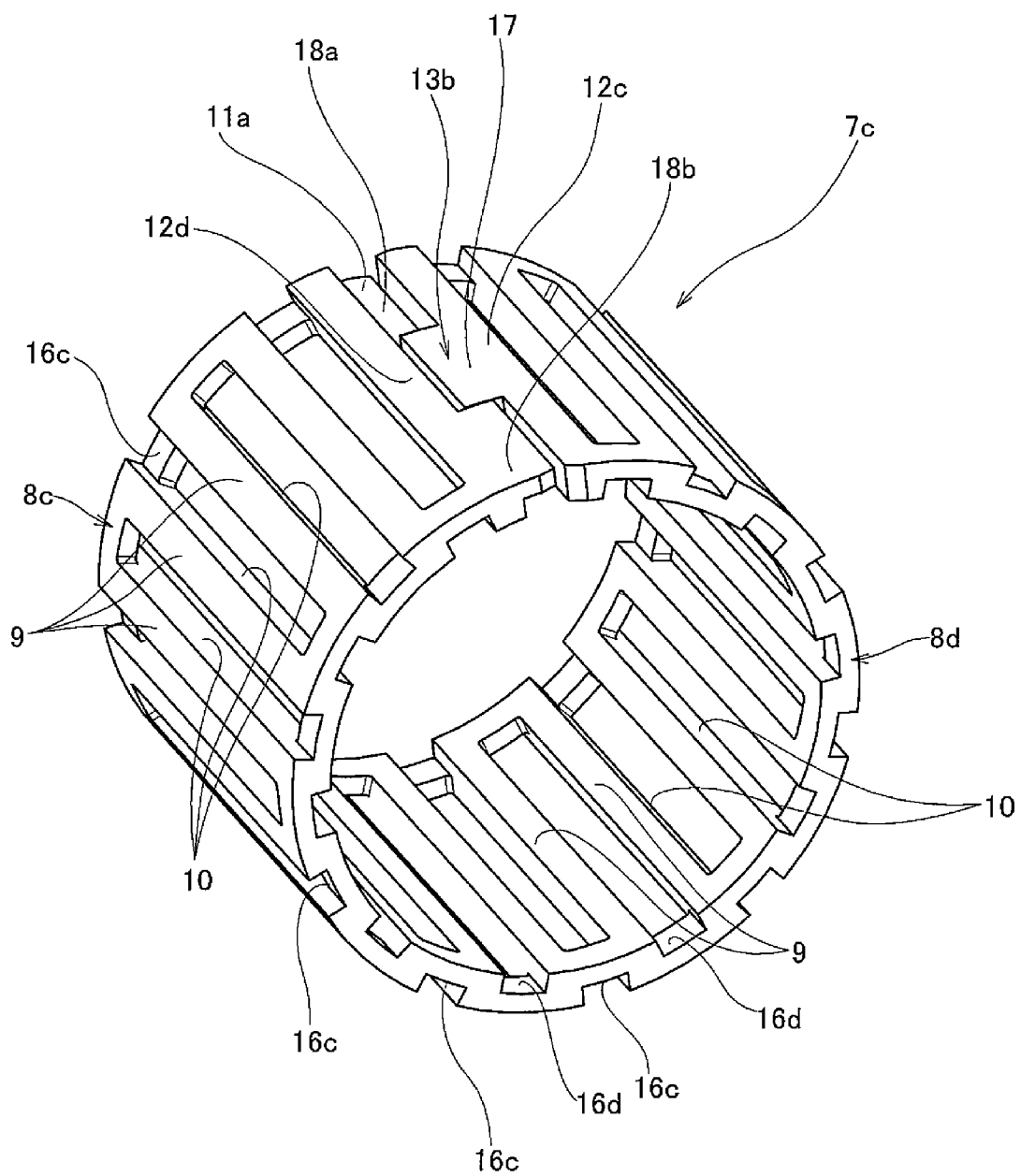
FIG. 5 is a perspective drawing illustrating a cage of a second example of an embodiment of the present invention, and illustrates the state as seen from the opposite side in the axial direction than that in FIG. 1.
Figure 6:
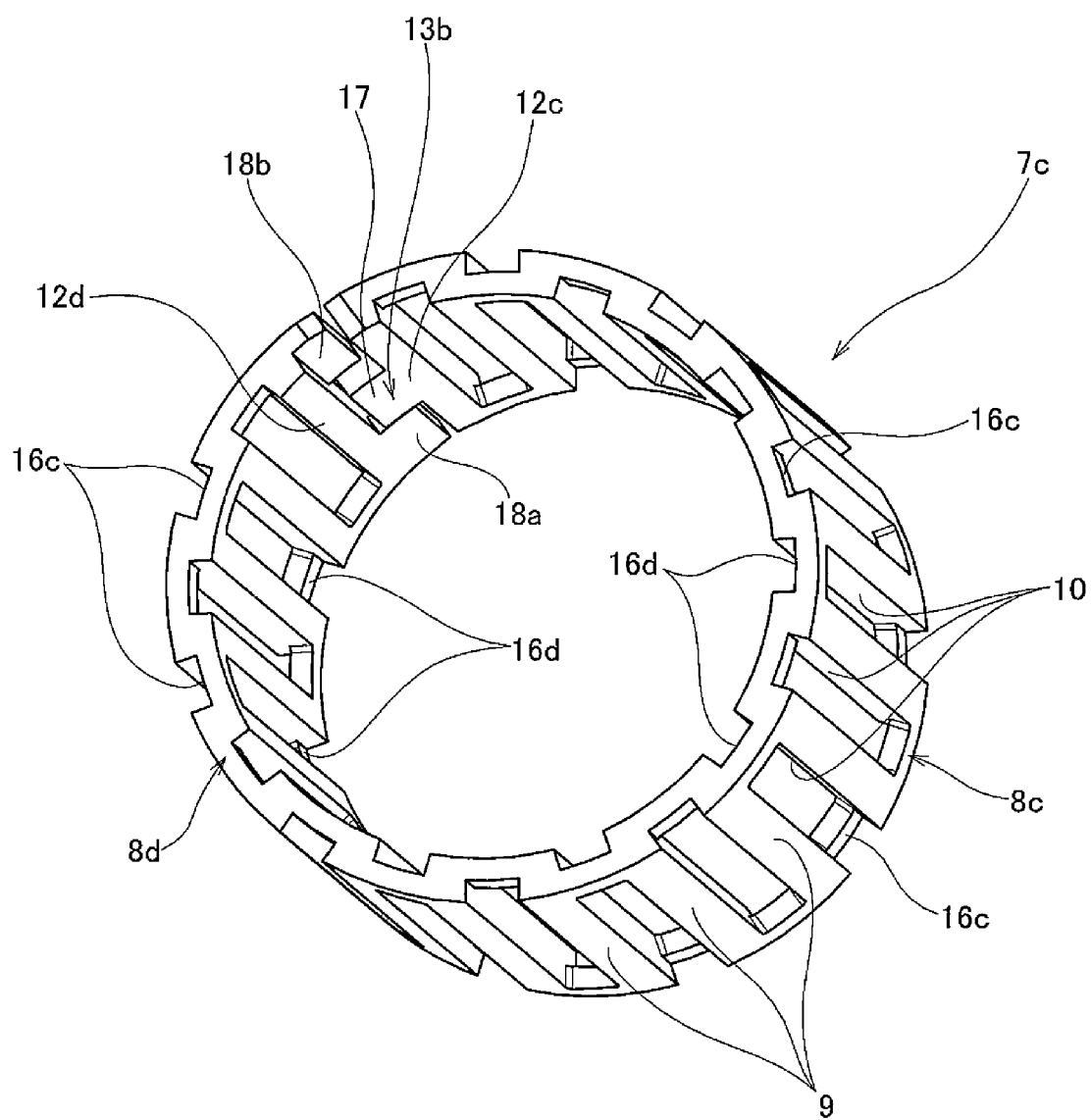
FIG. 6 is a perspective drawing of the cage of the second example as seen from a different angle (from below in FIG. 5).

FIG. 5 and FIG. 6 illustrate a second example of an embodiment of the present invention. In the case of the cage 7c of this example, the positions where the outside fitting pieces 18a, 18b of the fitting section 13b are formed differ from in the construction of the first example of an embodiment. More specifically, the positions in the radial direction of the pair of outside fitting pieces 18a, 18b that are provided on the other end section 12d are opposite from the case in the first example, where the outside fitting piece 18a is formed on one end section in the axial direction of the inner-diameter side half section of the end section 12d, and the outside fitting piece 18b is formed on the other end section in the axial direction of the outer-diameter side half section of the end section 12d. In this example as well, these outside fitting pieces 18a, 18b do not overlap each other with regard to the axial direction.

In the case of the cage 7c of this example having this kind of construction, as in the case of the first example of an embodiment, the cage 7c can be manufacturing using axial draw molding, and the end sections 12c, 12d that are provided on both sides of the non-continuous section 11a can be fitted together by way of the fitting section 13b so that relative displacement in the radial direction is possible and so that relative displacement in, the axial direction is not possible. The other construction, functions and effects of this example are the same as in the first example of an embodiment.

Third Example

Figure 7:
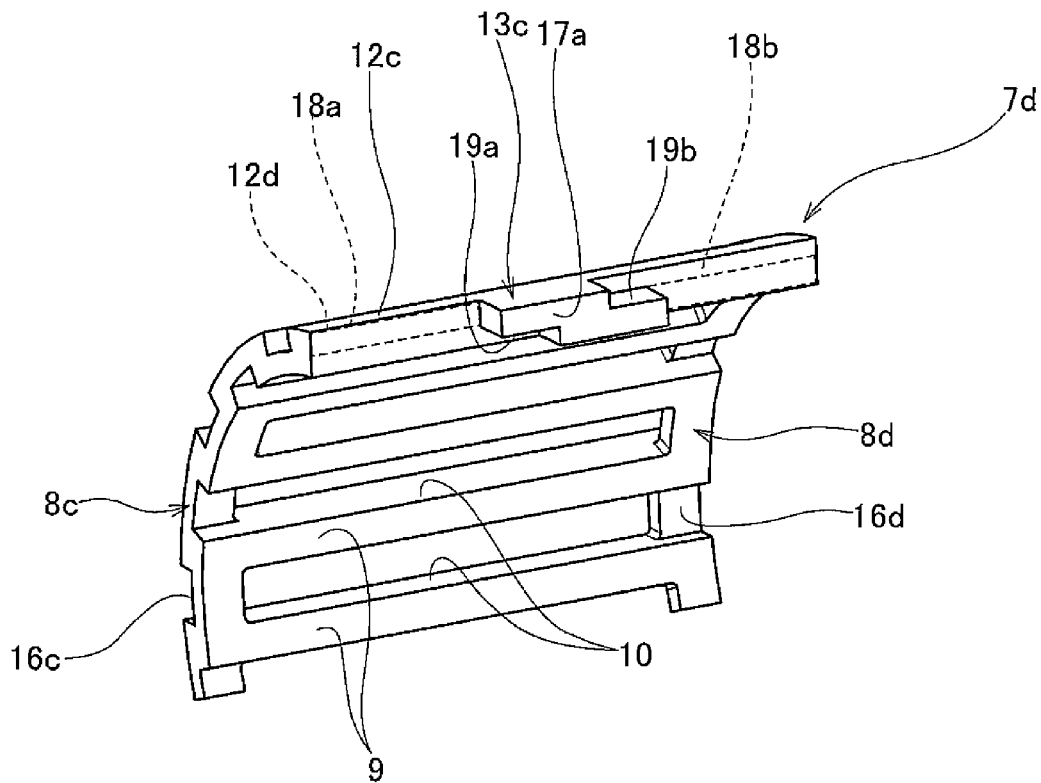
FIG. 7 is a perspective drawing illustrating one end section and its adjacent area of the cage of a third example of an embodiment of the present invention.

FIG. 7 illustrates a third example of an embodiment of the present invention. In the case of the cage 7d of this example, the shape of the inside fitting piece 17a of the fitting section 13c is devised so that after injection molding, transformation such as shrunken depressions or curves in the inside fitting piece 17 is prevented. In other words, in this example, cut away sections 19a, 19b having a rectangular shape are formed in portions on both sides in the axial direction of the inside fitting piece 17a, which reduces the dimension in the radial direction of the inside fitting piece 17a in these portions on both sides in the axial direction. More specifically, together with forming a cut away section 19a in a portion on the inner-diameter side of one side in the axial direction (left side in FIG. 7) of the inside fitting piece 17a, a cut away section 19b is formed in a portion on the outer-diameter side of the other side in the axial direction (right side in FIG. 7) of the inside fitting piece 17a. The inside fitting piece 17a of this example in which these kinds of cut away sections 19a, 19b are formed has a crankshaft shaped cross-sectional shape. These cut away sections 19a, 19b are formed at the same time as injection molding.

Together the outside fitting piece 18a that is formed on the outer-diameter side half section of the other end section 12d is located on one side in the axial direction of the inside fitting piece 17a, and the outside fitting piece 18b that is formed on the inner-diameter side half section of the other end section 12d is located on the other side in the axial direction of the inside fitting piece 17a. In this way, even when cut away sections 19a, 19b are formed in the inside fitting piece 17a, the inside fitting piece 17a and the outside fitting pieces 18a, 18b do no overlap in the radial direction. In this example having this kind of construction, the volume of the inside fitting piece 17a can be reduced, so after injection molding, it becomes difficult for shrinkage depressions to occur in the inside fitting piece. Therefore, it is possible to improve the precision of the dimensions of the inside fitting piece 17a. Moreover, by simply reducing the volume of the inside fitting piece 17a, it is possible to reduce the weight of the cage 7d, as well as reduce the material cost. The other construction, functions and effects of this example are the same as in the first example of an embodiment.

Fourth Example

Figure 8:
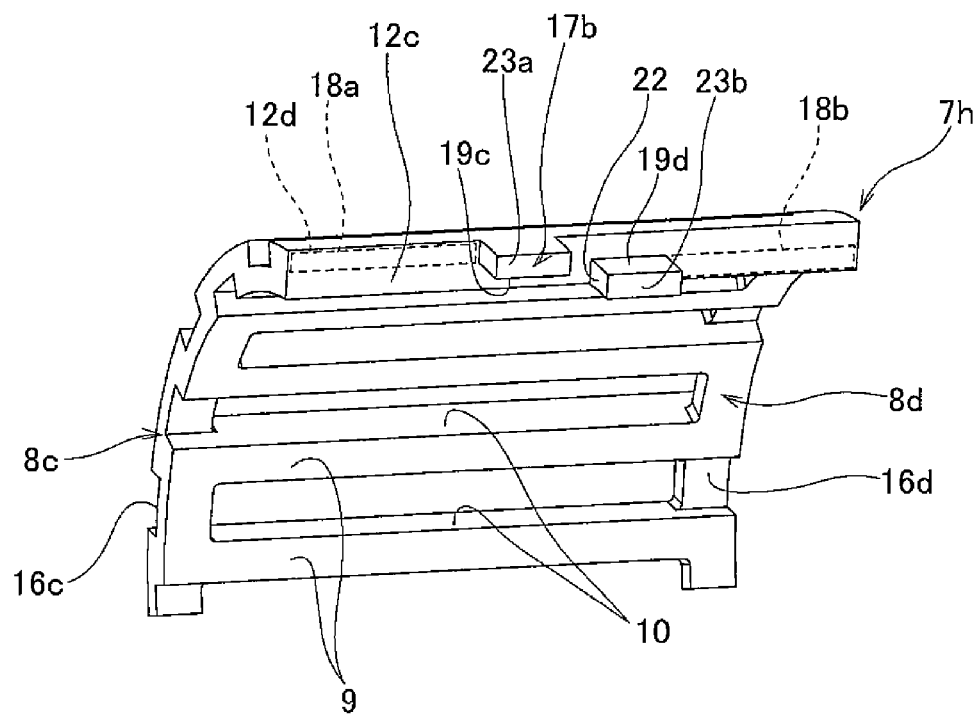
FIG. 8 is a perspective drawing illustrating one end section and its adjacent area of the cage of a fourth example of an embodiment of the present invention.

FIG. 8 illustrates a fourth example of an embodiment of the present invention. In the case of the cage 7h of this example, as is in the case of the third example, rectangular shaped cut away sections 19c, 19d are formed in portions on opposites sides in the radial direction of portions on both sides in the axial direction of the inside fitting piece 17b. Particularly in the case of this example, the length dimension in the axial direction of the cut away sections 19c, 19d is greater than the in third example of an embodiment, and the cut away sections 19c, 19d are continuous in the radial direction. More specifically, a cut away section 19c is formed in a portion of the inner-diameter side of one side in the axial direction (left side in FIG. 8) of the inside fitting piece 17b, and a cut away section 19d is formed in a portion of the outer-diameter side of the other side in the axial direction (right side in FIG. 8) of the inside fitting piece 17b. These cut away sections 19c, 19d are continuous in the radial direction in the center part in the axial direction of the end section 12c.

In doing so, the inside fitting piece 17b comprises a pair of inside fitting elements 23a, 23b that are separated in the axial direction and are on both sides of a non-continuous section 22 in the center section in the axial direction of the end section 12c. Of these, the inside fitting element 23a is provided on the outer-diameter side half section of a portion that is near one side in the axial direction of the end section 12c, and the inside fitting element 23b is provided on the inner-diameter side half section of a portion that is near the other side in the axial direction of the end section 12c. The inside fitting piece 17b having this kind of construction is made by injection molding with part of one split mold (mold tool element) that is located on one side in the axial direction and part of another split mold that is located on the other side in the axial direction overlapped in the radial direction in the center section in the axial direction.

Moreover, the outside fitting piece 18a that is formed on the outer-diameter side half section of the other end section 12d is located on one side in the axial direction of the inside fitting piece 17b (inside fitting element 23a), and the outside fitting piece 18b that is formed on the inner-diameter side half section of the end section 12d is located on the other side in the axial direction of the inside fitting piece 17b (inside fitting element 23b). In this way, even when cut away sections 19c, 19d are formed in the inside fitting piece 17b, the inside fitting piece 17b and the outside fitting pieces 18a, 18b do not overlap in the radial direction.

In the case of this example having construction such as described above, the volume of the inside fitting piece 17b is greatly reduced. Therefore, it is possible to suppress changes in flow of material during injection molding, and it is possible to effectively prevent the occurrence of deformation such as shrinkage depressions or bending of the inside fitting elements 23a, 23b of the inside fitting piece 17b. Therefore, it is possible to improve the precision of the dimensions of the inside fitting elements 23a, 23b. Moreover, it is possible to reduce the weight and lower the material costs of the cage 7h to an even higher degree. The other construction, functions and effects of this example are the same as in the first example and third example of an embodiment.

Fifth Example

Figure 9:
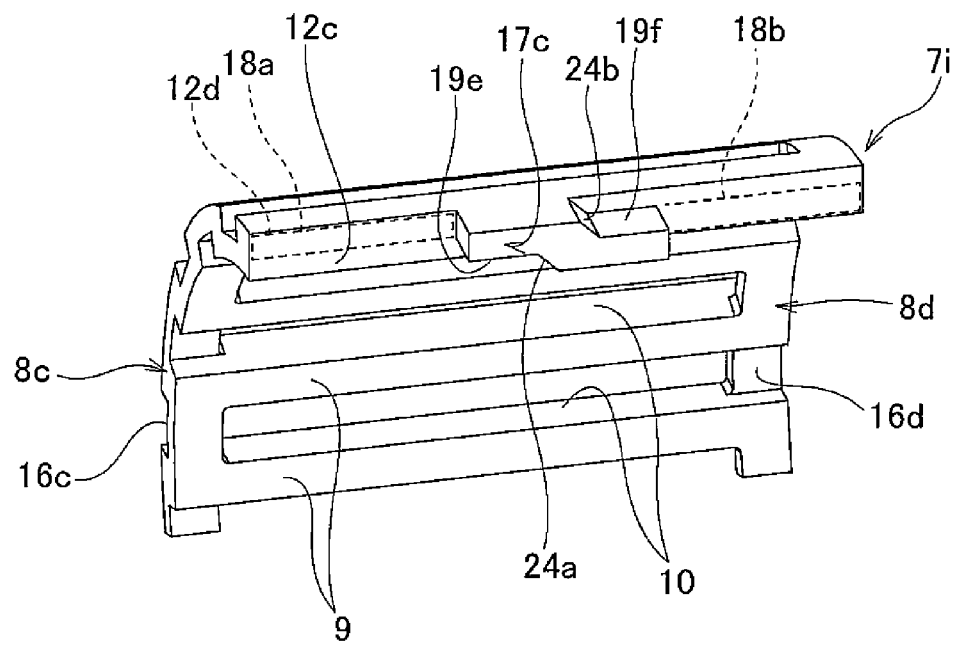
FIG. 9 is a perspective drawing illustrating one end section and its adjacent area of the cage of a fifth example of an embodiment of the present invention.

FIG. 9 illustrates a fifth example of an embodiment of the present invention. The cage 7i of this example is such that trapezoidal column shaped cut away sections 19e, 19f, the cross-sectional shape of which does not change in the circumferential direction, are formed in portions on opposite sides in the radial direction of portions on both sides in the axial direction of the inside fitting piece 17c. In doing so, the boundary surfaces in the axial direction of the inside fitting piece 17c with the cut away sections 19e, 19f are tapered surfaces 24a, 24b. Both of these tapered surfaces 24a, 24b are parallel with each other, and are inclined in a direction toward one side in the axial direction (left side in FIG. 9) going toward the outside in the radial direction.

In the case of this example having this kind of construction, it is possible to reduce the volume of the inside fitting piece 17c while at the same time maintaining the strength and rigidity of the inside fitting piece 17c. Therefore, even when the inside fitting piece 17c and the outside fitting pieces 18a, 18b collide during operation for example, it is possible to prevent damage or bending of the inside fitting piece 17c. Moreover, it is also possible to reduce the weight and cost of materials of the cage 7i. The other construction, functions and effects of this example are the same as in the first example and third, example of an embodiment.

Sixth Example

Figure 10:
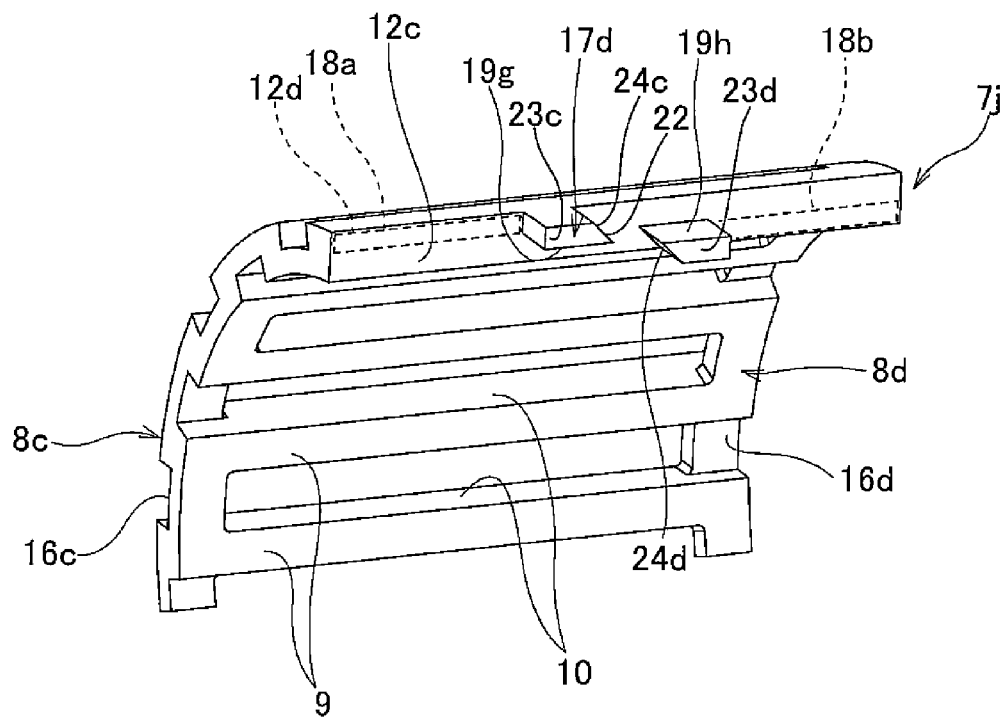
FIG. 10 is a perspective drawing illustrating one end section and its adjacent area of the cage of a sixth example of an embodiment of the present invention.

FIG. 10 illustrates a sixth example of an embodiment of the present invention. In the case of the cage 7j of this example as well, trapezoidal column shaped cut away sections 19g, 19h, the cross-sectional shape of which does not change in the circumferential direction, are formed in portions on opposite sides in the radial direction of portions on both side in the axial direction of the inside fitting piece 17d. Moreover, the pair of cut away sections 19g, 19h are continuous in the radial direction in the center section in the axial direction of the end section 12c. As a result, the inside fitting piece 17e comprises a pair of trapezoidal column shaped inside fitting elements 23c, 23d that are separated in the axial direction.

Moreover, the boundary surfaces in the axial direction of the inside fitting piece 17d with the cut away sections 19g, 19h are tapered surfaces 24c, 24d that incline in a direction toward one side in the axial direction (left side in FIG. 10) going toward the outside in the radial direction. More specifically, on the end section 12c, the surface on the other side in the axial direction (surface on the right side in FIG. 10) of the inside fitting element 23c that is provided on the outer-diameter side half section of a portion near one side in the axial direction, and the surface on one side in the axial direction of the inside fitting element 23d that is provided on the inner-diameter side half section of a portion near the other side in the axial direction are tapered surfaces 24c, 24d. Moreover, in this example, these tapered surfaces 24c, 24d are parallel with each other.

In the case of this example having this kind of construction, it is possible to greatly reduce the volume of the inside fitting piece 17d while at the same time maintain the strength and rigidity of the inside fitting elements 23c, 23d. Therefore, even in the case where the inside fitting elements 23c, 23d collide with the outside fitting pieces 18a, 18b during operation for example, it is possible to effectively prevent damage to or bending of the inside fitting elements 23c, 23c1. Moreover, it is possible to reduce the weight and material costs of the cage 7j at an even higher degree. The other construction, functions and effects of this example are the same as in the first example, third example and fourth example of an embodiment.

Seventh Example

Figure 11:
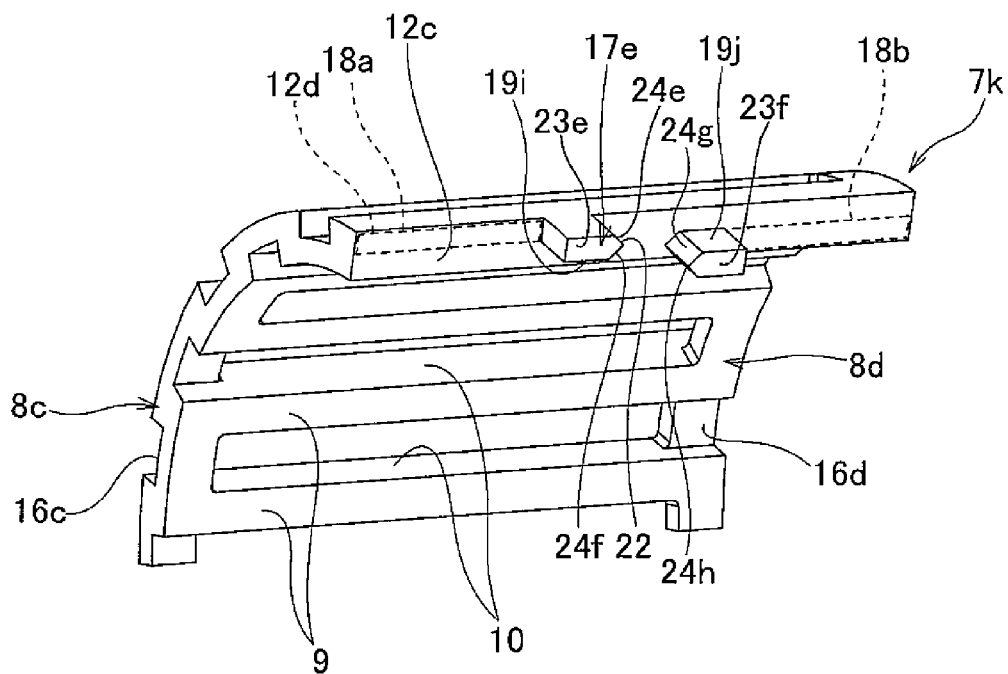
FIG. 11, is a perspective drawing illustrating one end section and its adjacent area of the cage of a seventh example of an embodiment of the present invention.

FIG. 11 illustrates a seventh example of an embodiment of the present invention. In the case of the cage 7k of this example, cut away sections 19i, 19j, having cross-sectional shapes such that trapezoids are overlapped in the radial direction, are formed in portions on opposite sides in the radial direction of portions on both sides in the axial direction of the inside fitting piece 17e. The pair of cut away sections are continuous in the radial direction in the center section in the axial direction of the end section 12c. As a result, the inside fitting piece 17e comprises a pair of inside fitting elements 23e, 23f having a rectangular cross section that are separated in the axial direction.

Moreover, the boundary surfaces in the axial direction of the inside fitting piece 17e with the cut away sections 19i, 19j are V-shaped complex surfaces that are formed by combining a set of tapered surfaces 24e, 24f, 24g, 24h having different inclination directions. More specifically, on the end section 12c, the side surface on the outer-diameter side of the other side surface in the axial direction (right side surface in FIG. 11) of the inside fitting element 23e that is provided on the outer-diameter side half section of a portion near one side in the axial direction (left side in FIG. 11) is a tapered surface 24e that is inclined in a direction toward one side in the axial direction going toward the outside in the radial direction. Moreover, the side surface on the inner-diameter side of the other side surface in the axial direction of the inside fitting element 23e is a tapered surface 24f that is inclined toward one side in the axial direction going toward the inside in the radial direction. On the other hand, on the end section 12c, the side surface on the outer-diameter side of one side surface (left side surface in FIG. 11) in the axial direction of the inside fitting element 23f that is provided on the inner-diameter side half section of a portion near the other side (right side in FIG. 11) in the axial direction is a tapered surface 24g that is inclined in a direction toward the other side going toward the outside in the radial direction. Moreover, the side surface on the inner-diameter side of the one side surface in the axial direction of the inside fitting element 23f is a tapered surface 24h that is inclined in a direction toward the other side in the axial direction going toward the inside in the radial direction.

In the case of this example having this kind of construction, as in the sixth example of an embodiment, it is possible to greatly reduce the volume of the inside fitting piece 17e while maintaining the strength and rigidity of the inside fitting elements 23e, 23f. Moreover, it is possible to reduce the weight and material costs of the cage 7k at an even higher degree. The other construction, functions and effects of this example are the same as in the first example, third example, fourth example and sixth example of an embodiment.

Eighth Example

Figure 12:
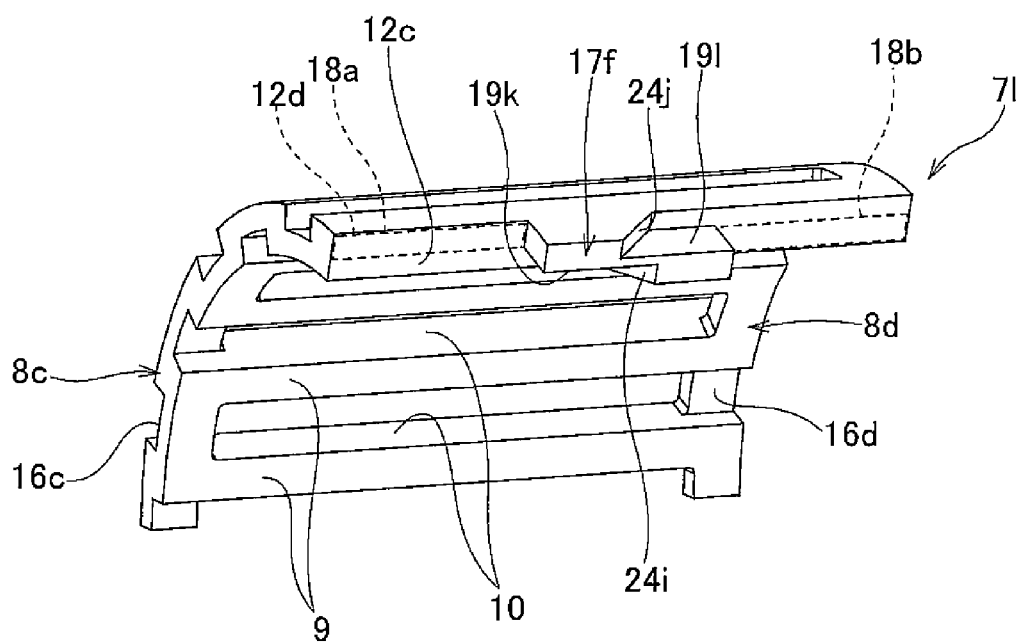
FIG. 12 is a perspective drawing illustrating one end section and its adjacent area of the cage of a eighth example of an embodiment of the present invention.

FIG. 12 illustrates an eighth example of an embodiment of the present invention. The cage 7l of this example is such that trapezoidal column shaped cut away sections 19k, 19l, the cross-sectional shape of which does not change in the radial direction, are formed in portions on opposite side in the radial direction of portions on both sides in the axial direction of the inside fitting piece 17f. As a result, the boundary surfaces in the axial direction of the inside fitting piece 17f with the cut away sections 19k, 19l are tapered surfaces 24i, 24j. Of these tapered surfaces 24i, 24j, the tapered surface 24i that is provided on the inside in the radial direction is inclined in a direction toward one side (left side in FIG. 12) in the axial direction going toward one side (rear side in the front/rear direction in FIG. 12) in the circumferential direction, and the tapered surface 24j that is provided on the outside in the radial direction is inclined toward the other side (right side in FIG. 12) in the axial direction going toward the one side in the circumferential direction.

In the case of this example having this kind of construction, as in the fifth example of an embodiment, it is possible to reduce the volume of the inside fitting piece 17f while at the same time maintaining the strength and rigidity of the inside fitting piece 17f. Particularly, in the case of this example, it is possible to keep the dimension in the axial direction of the base end section of the inside fitting piece 17f large, so is advantageous in maintaining the strength and rigidity. Moreover, together with reducing the weight of the cage 7l, it is also possible to reduce the material cost. The other construction, functions and effects of this example are the same as in the first example, third example and fifth example.

Ninth Example

Figure 13:
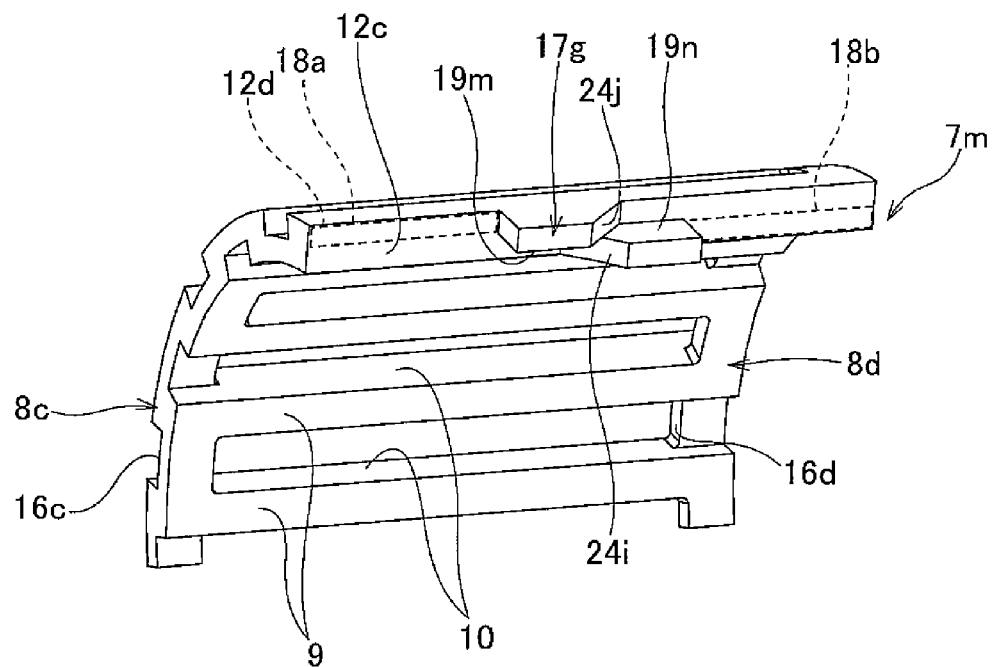
FIG. 13 is a perspective drawing illustrating one end section and its adjacent area of the cage of a ninth example of an embodiment of the present invention.

FIG. 13 illustrates a ninth example of an embodiment of the present invention. In the case of the cage 7m of this example, trapezoidal column shaped cut away sections 19m, 19n, the cross-section shape of which does not change in the radial direction, are formed in portions on opposite side in the radial direction of portions on both sides in the axial direction of the inside fitting piece 17g. Particularly, in the case of this example, the length dimensions in the axial direction of the cut away sections 19m, 19n are a little greater than those in the case of the eighth example of an embodiment. As a result, parts of the pair of cut away sections 19m, 19n are continuous in the radial direction.

In this example having this kind of construction, it is possible to reduce the volume of the inside fitting piece 17g more than in the eighth example of an embodiment. Moreover, it is possible to keep the dimension in the axial direction of the base end section of the inside fitting piece 17g large, so is advantageous in maintaining the strength and rigidity. In addition, it is possible to further reduce the weight and material costs of the cage 7m. The other construction, functions and effects of this example are the same as in the first example, third example and eighth example of an embodiment.

Tenth Example

Figure 14:
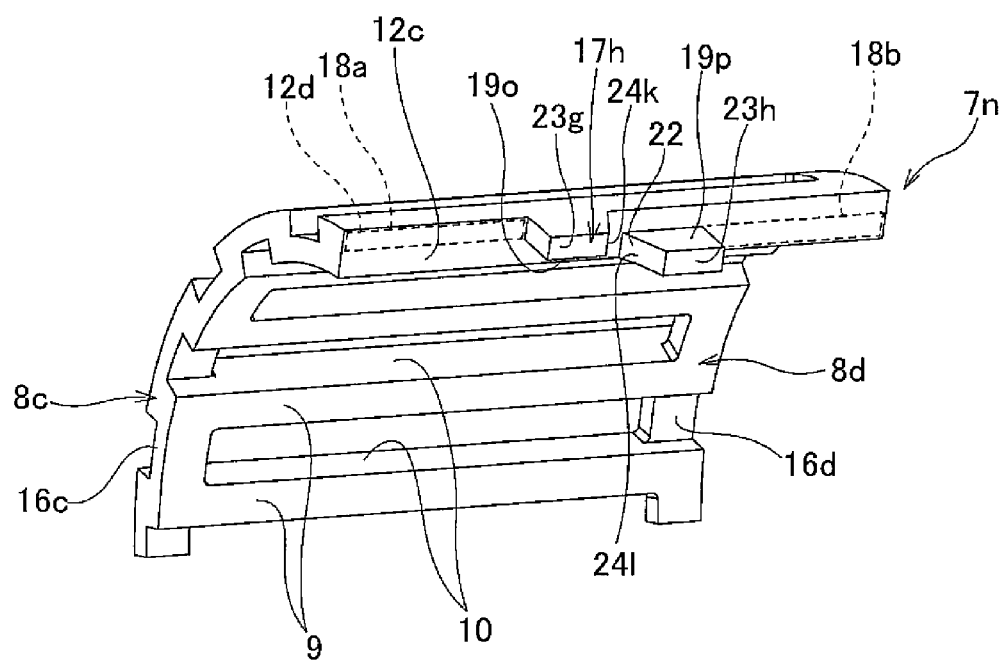
FIG. 14 is a perspective drawing illustrating one end section and its adjacent area of the cage of a tenth example of an embodiment of the present invention.

FIG. 14 illustrates a tenth example of an embodiment of the present invention. In the case of the cage 7h of this example, trapezoidal column shaped, cut away sections 19o, 19p, the cross-section shape of which does not change in the radial direction, are formed in portions on opposite side in the radial direction of portions on both sides in the axial direction of the inside fitting piece 17h. Moreover, the pair of cut away sections 19o, 19p are continuous in the radial direction in the center section in the axial direction of the end section 12c. As a result, the inside fitting piece 17h comprises a pair of trapezoidal column shaped inside fitting elements 23g, 23h that are separated in the axial direction.

The boundary surfaces in the axial direction of the inside fitting piece 17h with the cut away sections 19o, 19p are tapered surfaces 24k, 24l that are inclined in a direction toward the inside in the axial direction going toward one side (rear side in the front/rear direction in FIG. 14) in the circumferential direction. More specifically, on the end section 12c, the surface on the other side (right side surface in FIG. 14) in the axial direction of the inside fitting element 23g that is provided on the outer-diameter side half section of a portion near one side in the axial direction is a tapered surface 24k that is inclined in a direction toward the other side (right side in FIG. 14) in the axial direction going toward one side in the circumferential direction. On the end section 12c, the surface on one side (left side surface in FIG. 14) in the axial direction of the inside fitting element 23h that is provided on the inner-diameter side half section of a portion near the other side in the axial direction is a tapered surface 24l that is inclined in a direction toward one side (left side in FIG. 14) in the axial direction going toward one side in the circumferential direction.

In the case of this example having this kind of construction, as in the sixth example and seventh example of an embodiment, it is possible to greatly reduce the volume of the inside fitting piece 17h while at the same time maintaining strength and rigidity of the inside fitting elements 23g, 23h. Moreover, it is possible to keep the dimension in the axial direction of the base end section of the inside fitting elements 23g, 23h large, so is advantageous in maintaining the strength and rigidity. Furthermore, it is possible to reduce the weight and material costs of the cage 7h. The other construction, functions and effects of this example are the same as in the first example, third example, fourth example, sixth example and seventh example of an embodiment.

Eleventh Example

Figure 15:
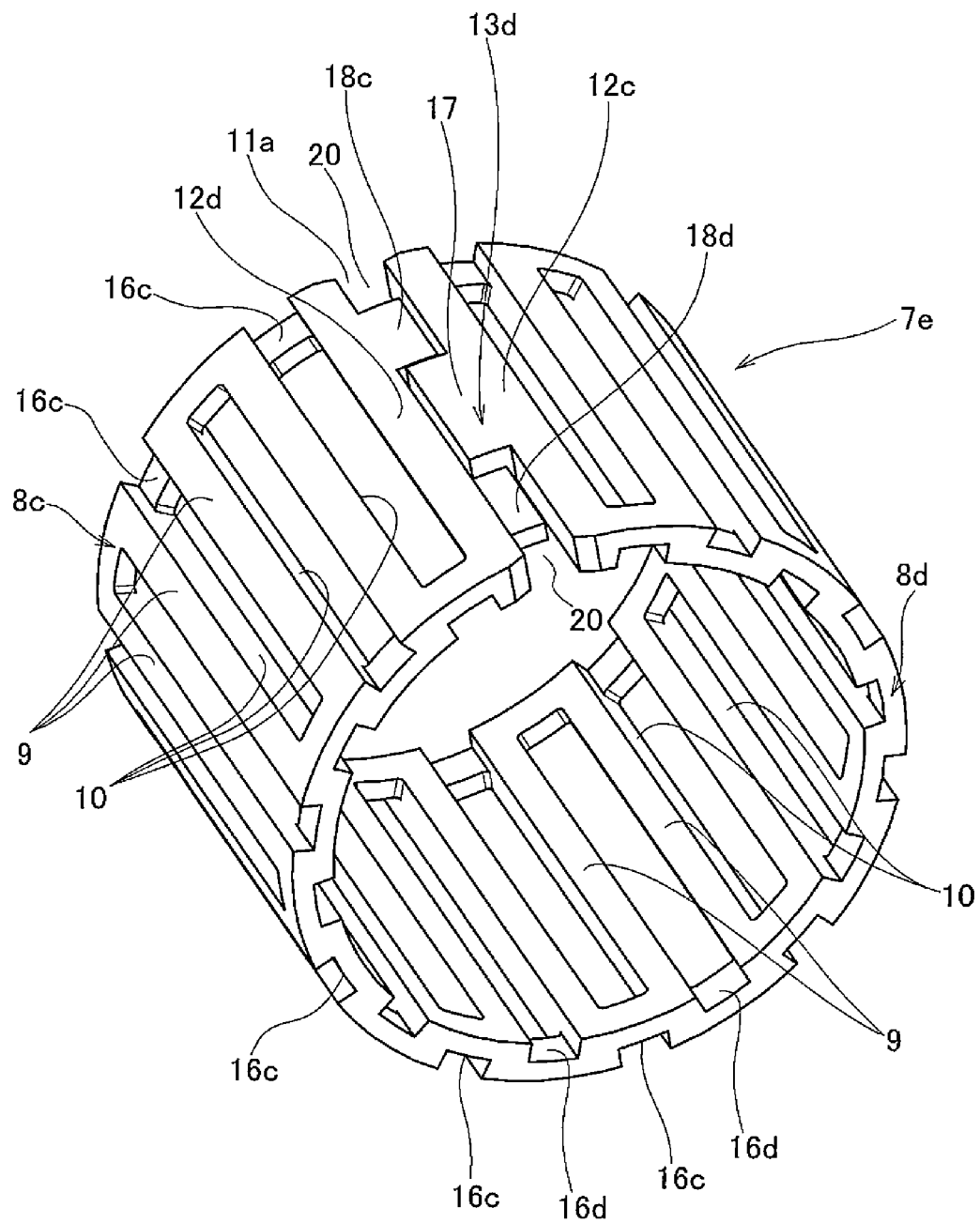
FIG. 15 is a perspective drawing illustrating a cage of an eleventh example of an embodiment of the present invention, and illustrates the state as seen from the opposite side in the axial direction than that in FIG. 1.
Figure 16:
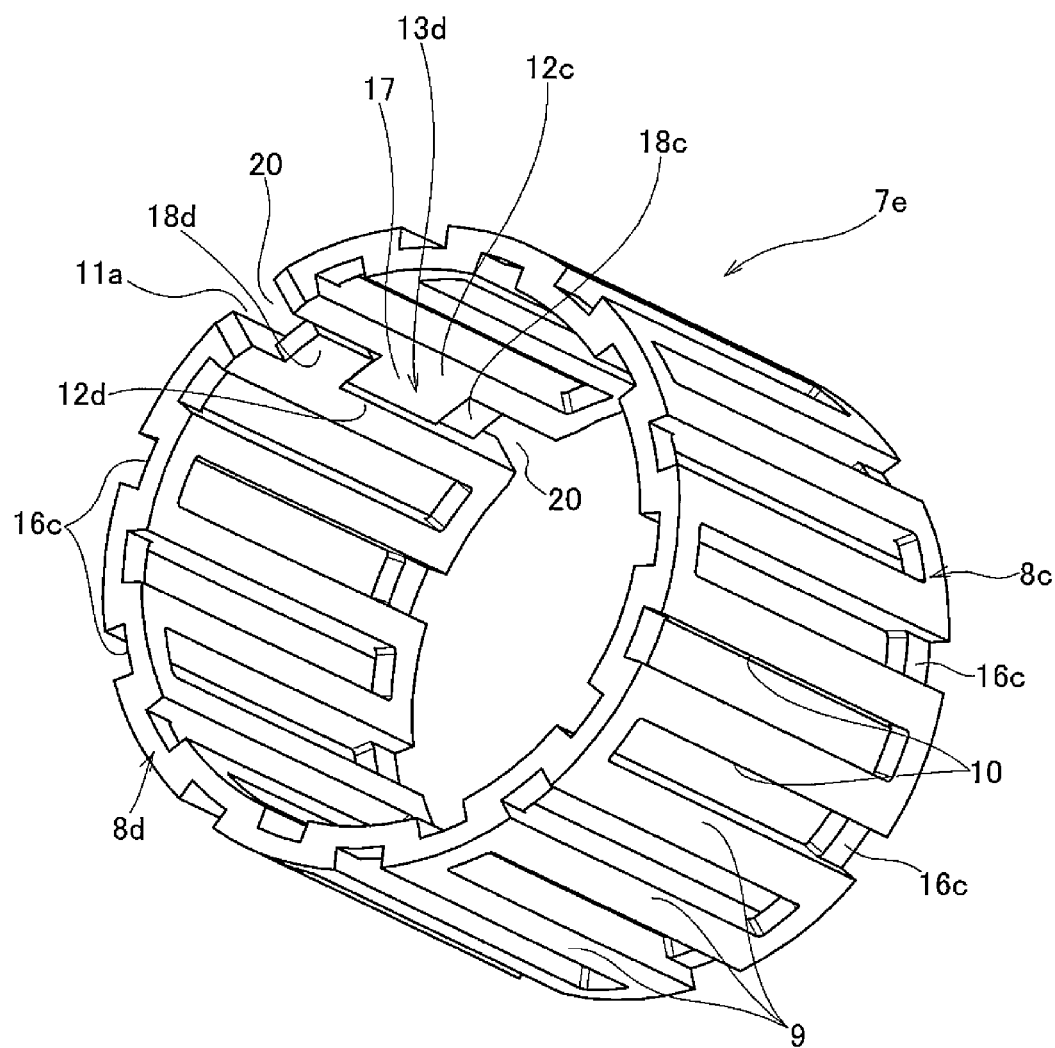
FIG. 16 is a perspective drawing of the cage of the eleventh example as seen from a different angle (from below in FIG. 15).

FIG. 15 and FIG. 16 illustrate an eleventh example of an embodiment of the present invention. In the case of the cage 7e of this example, both end sections in the axial direction of the fitting section 13d are offset further toward (biased toward) the center side in the axial direction than the side surfaces (outside surfaces) in the axial direction of the rim sections 8c, 8d. In other words, the fitting section 13d is provided only in the middle section in the axial direction, having both end sections in the axial direction of the cage 7e removed. Therefore, in this example, the outside fitting pieces 18c, 18d of the fitting section 13d are formed being offset toward the center side in the axial direction and are not formed on the end sections in the axial direction of the end section 12d. That is, the outside fitting pieces 18c, 18d have a shape as though the end sections in the axial direction thereof have been removed from the outside fitting pieces 18a, 18b of the first example of an embodiment. With construction such as this, in the case of this example, insertion spaces 20 are formed in portions on both sides in the axial direction of the fitting section 13d by opening up portions on both sides in the radial direction and portions on opposites sides in the axial direction of the fitting section 13d.

In the case of cage 7e of this example, provided with insertion spaces 20 such as these, it is possible to insert positioning pins (not illustrated in the figure) inside these insertion spaces 20 when performing automatic assembly of the radial roller bearing (work of inserting rollers into the pockets 10). Therefore, by accurately regulating the position in the circumferential direction of the positioning pins, it is possible to accurately match the position in the circumferential direction of the pockets 10 to the insertion position of the rollers 6 (refer to FIG. 23). As a result, it is possible to improve the efficiency of the work of assembling the radial roller bearing. Furthermore, together with being able to reduce the weight of the cage 7e by the amount that the insertion spaces 20 were formed, there is also an advantage in that it is possible to prevent shrinkage depressions during injection molding. The other construction, functions and effects of this example are the same as in the first example of an embodiment.

Twelfth Example

Figure 17:
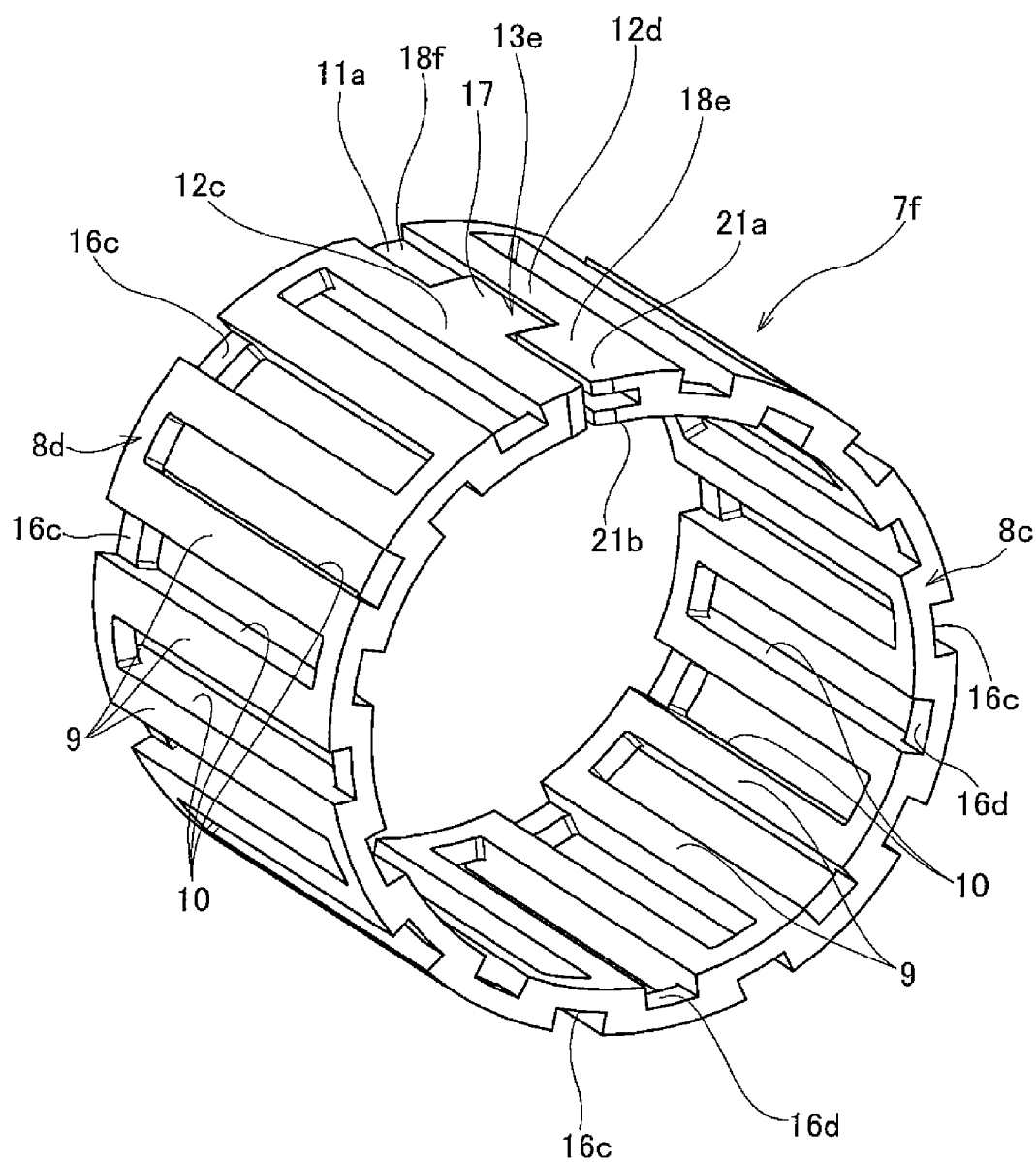
FIG. 17 is a perspective drawing illustrating a cage of a twelfth example of an embodiment of the present invention.
Figure 18:
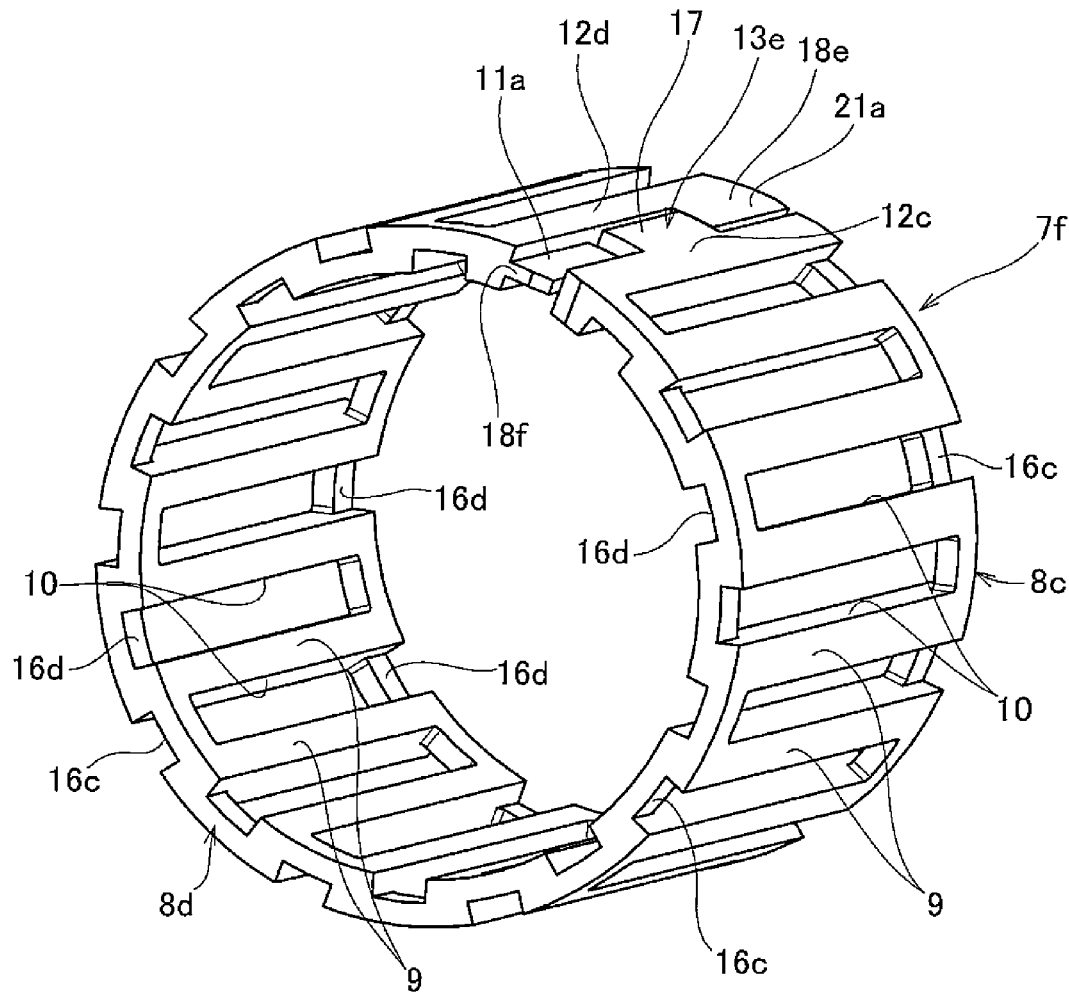
FIG. 18 is a perspective drawing illustrating the cage of the twelfth example, and illustrates the state as seen from the opposite side in the axial direction than that in FIG. 17.
Figure 19:
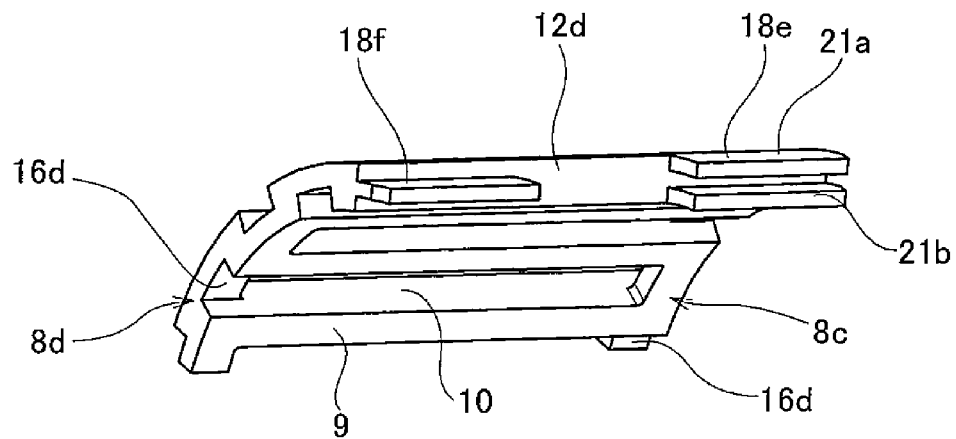
FIG. 19 is a perspective drawing illustrating the other end section and its adjacent area of the cage of the twelfth example.

FIG. 17 to FIG. 19 illustrate a twelfth example of an embodiment of the present invention. In the case of the cage 7f of this example, the shapes of the outside fitting pieces 18e, 18f of the fitting section 13e have been devised, making it more difficult for the inside fitting piece 17, which is located in the portion between these outside fitting pieces 18e, 18f, to ride up on these outside fitting pieces 18e, 18f. More specifically, the outside fitting piece 18e that is provided on one side (right side in FIG. 19) in the axial direction of the other end section 12d comprises a pair of rectangular plate shaped (partial cylindrical shaped) outside fitting thin plates 21a, 21b that are separated in the radial direction. The dimension in the radial direction of these outside fitting groove plates 21a, 21b is ⅓ the dimension in the radial direction of the end section 12d. Of these, the outside fitting thin plate 21a is provided on the outside end section in the radial direction of the end section 12d, and the outside fitting thin plate 21b is provided on the inside end section in the radial direction of the end section 12d. On the other hand, the outside fitting piece 18f that is provided on the other side (left side in FIG. 19) in the axial direction of the end section 12d is such that the dimension in the radial direction is ⅓ the dimension in the radial direction of the end section 12d, and is provided in the center section in the radial direction of the end section 12d. In the case of this example as well, the outside fitting piece 18e (outside fitting thin plates 21a, 21b) and the outside fitting piece 18f do not overlap each other with regard to the axial direction.

In this example, the dimension in the radial direction from the outside surface in the radial direction of the outside fitting piece 18e (outside surface in the radial direction of the outside fitting thin plate 21a on the outside in the radial direction) to the inside surface in the radial direction (inside surface in the radial direction of the outside fitting thin plate 21b on the inside in the radial direction) can be kept sufficiently greater (about two times greater) than the outside fitting piece 18a in the first example of an embodiment. Therefore, it becomes difficult for the inside fitting piece 17 to ride up on the outside fitting piece 18e. Furthermore, in this example, the outside fitting piece 18f is provided in the center section in the radial direction of the end section 12d, so when compared with the case of being biased in the radial direction, it becomes difficult for the inside fitting piece 17 to ride up on the outside fitting piece 18f. As a result, in the case of this example, the fitting section 13e is able to effectively prevent relative displacement in the axial direction of the end sections 12c, 12d. The other construction, functions and effects of this example are the same as in the first example of an embodiment.

Thirteenth Example

Figure 20:
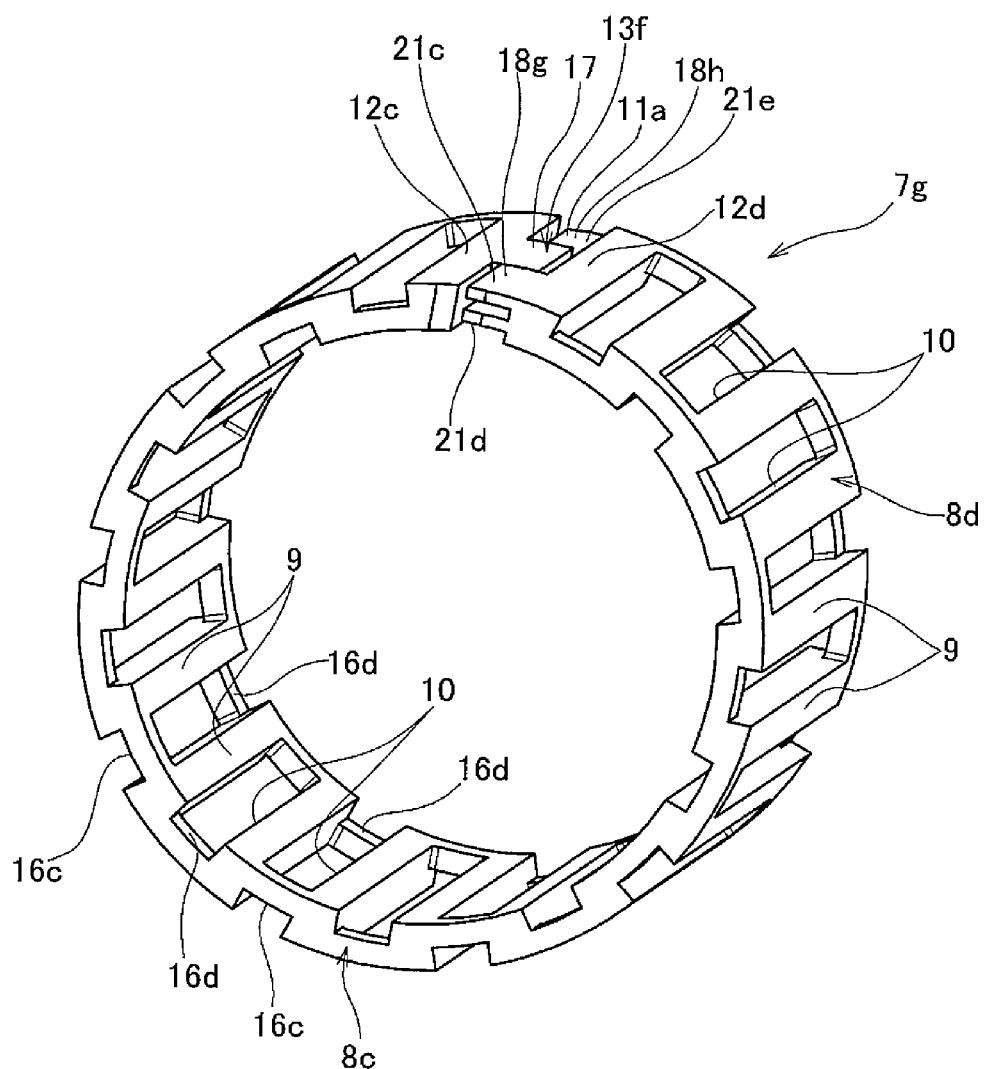
FIG. 20 is a perspective drawing illustrating a cage of a thirteenth example of an embodiment of the present invention.
Figure 21:
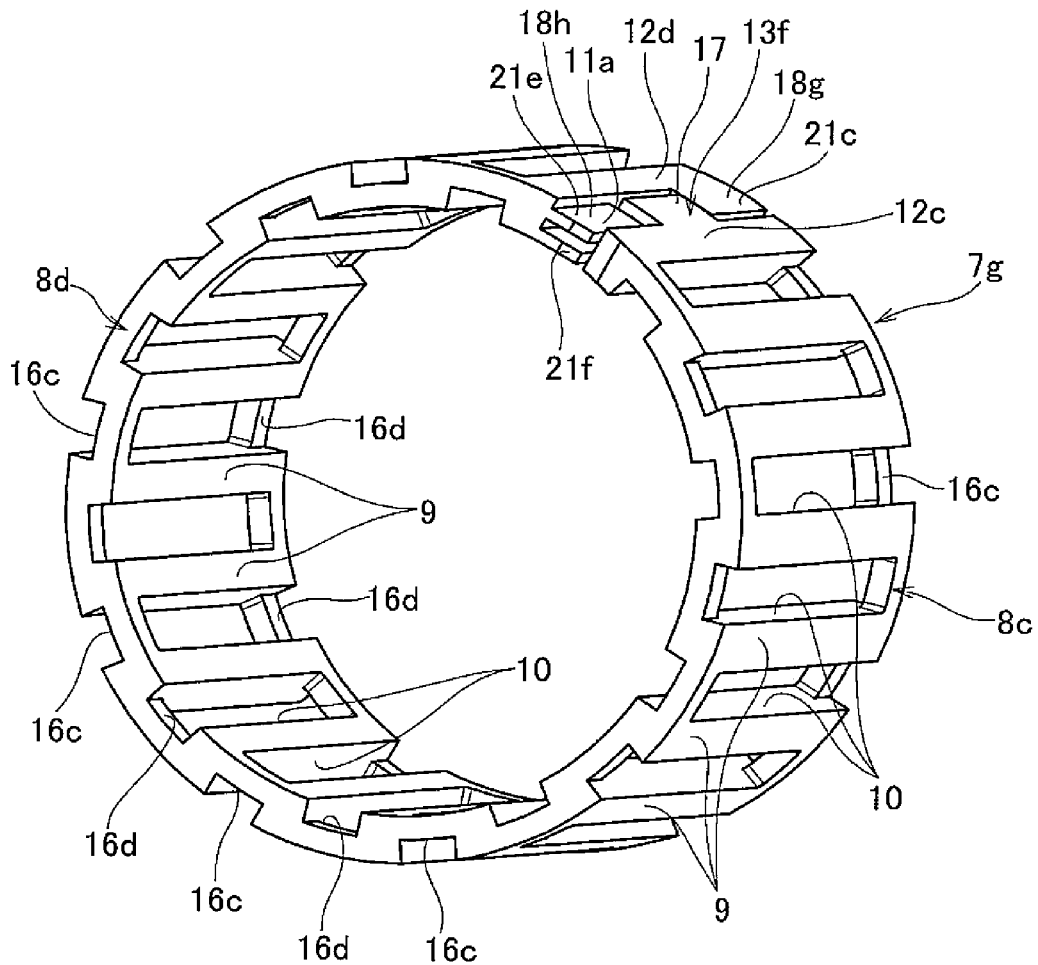
FIG. 21 is a perspective drawing illustrating the cage of the thirteenth example, and illustrates the state as seen from the opposite side in the axial direction than that in FIG. 20.
Figure 22:
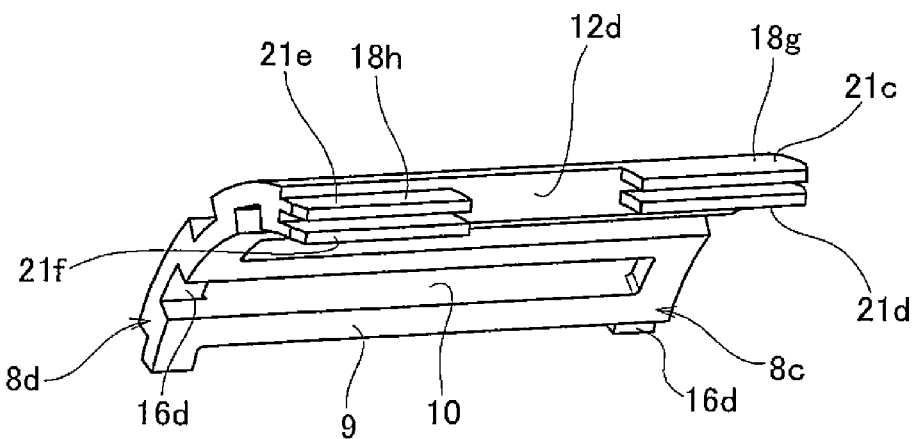
FIG. 22 is a perspective drawing illustrating the other end section and its adjacent area of the cage of the thirteenth example.

FIG. 20 to FIG. 22 illustrate a thirteenth example of an embodiment of the present invention. In the case of the cage 7g of this example as well, the shapes of the outside fitting pieces 18g, 18h of the fitting section 13f are devised such that it is more difficult for the inside fitting piece 17, which is located in the portion between these outside fitting pieces 18g, 18h, to ride up on these outside fitting pieces 18g, 18h. More specifically, the outside fitting piece 18g that is provided on one side (right side in FIG. 22) in the axial direction of the other end section 12d comprises a pair of rectangular plate shaped (partial cylindrical shaped) outside fitting thin plates 21c, 21d that are separated in the radial direction. The dimension in the radial direction of these outside fitting thin plates 21c, 21d is ¼ the dimension in the radial direction of the end section 12c1. Of these, the outside fitting thin plate 21c is provided on the outside end section in the radial direction of the end section 12d, and the outside fitting thin plate 21d is provided in the portion near the inside in the radial direction of the end section 12d (second position from the inner-diameter side when the end section 12d is divided into four in the radial direction).

Moreover, the outside fitting piece 18h that is provided on the other side (left side in FIG. 22) in the axial direction of the end section 12d also comprises a pair of rectangular plate shaped (partial cylindrical shaped) outside fitting thin plates 21e, 21f that are separated in the radial direction. The dimension in the radial direction of these outside fitting thin plates 21e, 21f is ¼ the dimension in the radial direction of the end section 12d. Of these, the outside fitting groove plate 21e is provided in the portion near the outside in the radial direction of the end section 12d (second position from the outer-diameter side when the end section 12d is divided into four in the radial direction), and the outside fitting thin plate 21f is provided on the inside end section in the radial direction of the end section 12d. In the case of this example, the outside fitting piece 18g (outside fitting thin plates 21c, 21d) and the outside fitting piece 18h (outside fitting thin plates 21e, 21f) do not overlap each other with respect to the axial direction.

In this example, the dimension in the radial direction from the outside surface in the radial direction of the outside fitting piece 18g (outside surface in the radial direction of the outside fitting thin plate 21c on the outside in the radial direction) to the inside surface in the radial direction (inside surface in the radial direction of the outside fitting thin plate 21d on the inside in the radial direction) can be kept sufficiently greater than in the case of the outside fitting piece 18a in the first example of an embodiment (about 1.5 times greater). Therefore, it becomes difficult for the inside fitting piece 17 to ride up on the outside fitting piece 18g. Similarly, the dimension in the radial direction from the outside surface in the radial direction of the outside fitting piece 18h (outside surface in the radial direction of the outside fitting thin plate 21e on the outside in the radial direction) to the inside surface in the radial direction (inside surface in the radial direction of the outside fitting thin plate 21f on the inside in the radial direction) can be kept sufficiently greater than in the case of the outside fitting piece 18b in the first example of an embodiment (about 1.5 times greater). Therefore, it becomes difficult for the inside fitting piece 17 to ride up on the outside fitting piece 18h. As a result, in this example as well, the fitting section 13f is able to effectively prevent relative displacement in the axial direction of the end sections 12c, 12d. The other construction, functions and effects of this example are the same as in the first example and twelfth example of an embodiment.

The construction of all of the examples of an embodiment of the present invention can be appropriately combined. Moreover, the shapes of the inside fitting piece and outside fitting pieces are not limited to rectangular shapes, and it is possible to employ other shapes such as triangular shapes and the like. Furthermore, in the twelfth example and thirteenth example of an embodiment, the case of constructing the outside fitting pieces with two outside fitting thin plates was explained, however, the number of outside fitting groove plates of the outside fitting pieces is not limited to two, and depending on the diameter or material of the cage, could be three or more. It is also not necessary to make the dimension in the radial direction of the outside fitting thin plates of the outside fitting pieces be the same, and can be different.

EXPLANATION OF THE REFERENCE NUMBERS

1 Radial roller bearing
2 Outer-diameter side member
3 Outer-ring raceway
4 Shaft
5 Inner-ring raceway
6 Roller
7, 7a to 7h Cage
8, 8a to 8d Rim section
9 Column section
10 Pocket
11, 11a Non-continuous section
12a to 12d End section
13, 13a to 13f Fitting section
14a, 14b Outer-diameter side fitting piece
15a, 15b Inner-diameter side fitting piece
16a to 16d Concave section
17, 17a to 17h Inside fitting piece
18a to 18h Outside fitting piece
19a to 19p Cut away section 20 Insertion space
21a to 21f Outside fitting thin plate
22 Non-continuous section
23a to 23h Inside fitting element

What is claimed is:

1. A cage for a radial roller bearing, that is made into a single piece by injection molding using an axial draw mold having a pair of split molds, the cage comprising: a pair of rim sections, a plurality of column sections, a plurality of pockets and a fitting section, and provided with a non-continuous section at one location in the circumferential direction, wherein the pair of rim sections is incomplete ring shaped, and is provided concentric to each other with a space between them in the axial direction, with concave sections that are recessed in the radial direction and that are formed at positions of the circumferential surfaces of these rim sections that are aligned in the axial direction with the pockets, and the formation locations of these concave sections are opposite in the radial direction on both sides in the axial direction of the pockets;

the column sections are provided intermittently in the circumferential direction and span between the rim sections;

the pockets are provided in portions that are surrounded on four sides by the rim sections and the column sections that are adjacent in the circumferential direction; and the fitting section fits together end sections that are provided on both sides of the non-continuous section;

the fitting section comprises: an inside fitting piece that is provided in the middle section in the axial direction of one of the end sections, and extends in the circumferential direction toward the other end section; and a pair of outside fitting pieces that are provided in separated portions on both sides in the axial direction of the other end section, and extend in the circumferential direction toward the one end section; and by placing the inside fitting piece in the portion between the outside fitting pieces, the inside fitting piece and the outside fitting pieces fit together in the axial direction without the inside fitting piece and the outside fitting pieces overlapping each other in the radial direction.

2. The cage for a radial roller bearing according to claim 1, wherein cut away sections are formed in portions on opposite side in the radial direction of portions on both sides in the axial direction of the inside fitting piece.

3. The cage for a radial roller bearing according to claim 2, wherein boundary surfaces in the axial direction of the inside fitting piece with the cut away sections are tapered surfaces.

4. The cage for a radial roller bearing according to claim 2, wherein by making the pair of cut away sections continuous in the radial direction, the inside fitting piece comprises a pair of inside fitting elements that are separated in the axial direction.

5. The cage for a radial roller bearing according to claim 1, wherein by making the end sections in the axial direction of the pair of outside fitting pieces be offset further toward the center side in the axial direction than the side surface in the axial direction of the rim sections, insertion spaces are formed in the portions on both sides of the fitting section.

6. The cage for a radial roller bearing according to claim 1, wherein the outside fitting pieces comprises a plurality of outside fitting thin plates that are separated in the radial direction.

* * * * *